(12) United States Patent
Nakatsuji et al.

(10) Patent No.: US 6,531,545 B1
(45) Date of Patent: Mar. 11, 2003

(54) THERMOPLASTIC OLEFIN ELASTOMER COMPOSITION FOR POWDER MOLDING, POWDER FOR POWDER MOLDING, AND MOLDED OBJECT

(75) Inventors: Yoshihiro Nakatsuji, Chiba (JP); Hiroyuki Sugimoto, Funabashi (JP); Kohsuke Ohtani, Sodegaura (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/581,964

(22) PCT Filed: Dec. 17, 1998

(86) PCT No.: PCT/JP98/05702

§ 371 (c)(1),
(2), (4) Date: Aug. 16, 2000

(87) PCT Pub. No.: WO99/32556

PCT Pub. Date: Jul. 1, 1999

(30) Foreign Application Priority Data

Dec. 22, 1997 (JP) ............................................. 9-352912

(51) Int. Cl.[7] .................................................. C08F 8/00
(52) U.S. Cl. ...................................... 525/191; 525/240
(58) Field of Search ................................... 525/191, 240

(56) References Cited

U.S. PATENT DOCUMENTS

| 4,168,361 A | 9/1979 | Oda et al. |
| 5,977,259 A | 11/1999 | Sugimoto et al. |
| 6,348,535 B1 * | 2/2002 | Sugimoto et al. ........... 264/241 |

FOREIGN PATENT DOCUMENTS

| EP | 0400333 A2 | 12/1990 |
| EP | 0479580 A2 | 4/1992 |
| EP | 0834533 A1 | 4/1998 |
| EP | 0842939 A1 | 5/1998 |
| EP | 0842955 A2 | 5/1998 |
| EP | 0887378 A | 12/1998 |
| EP | 0994152 A1 | 4/2000 |
| EP | 1038918 A1 | 9/2000 |
| JP | A051183 | 1/1993 |
| JP | A987313 | 3/1997 |
| WO | 9700911 | 1/1997 |
| WO | WO9700911 A1 | 1/1997 |
| WO | 9733940 | 9/1997 |
| WO | WO9733940 A1 | 9/1997 |

* cited by examiner

*Primary Examiner*—Nathan M. Nutter
(74) *Attorney, Agent, or Firm*—Birch, Stewart, Kolasch & Birch, LLP

(57) ABSTRACT

An olefin-based thermoplastic elastomer composition for powder molding is described. The olefin-based thermoplastic elastomer composition produces no emission of poisonous gas at incineration. It is hardly whitened on bending and has excellent flexibility.

10 Claims, No Drawings

THERMOPLASTIC OLEFIN ELASTOMER COMPOSITION FOR POWDER MOLDING, POWDER FOR POWDER MOLDING, AND MOLDED OBJECT

This application is the national phase under 35 U.S.C. §371 of PCT International Application No. PCT/JP98/05702 which has an International filing date of Dec. 17, 1998, which designated the United States of America.

TECHNICAL FIELD

The present invention relates to an olefin-based thermoplastic elastomer composition for powder molding, powder for powder molding, and a molded article. More particularly, the present invention relates to an olefin-based thermoplastic elastomer composition for powder molding, which makes the best use of the merit of an olefin-based material such as no generation of poisonous gas at incineration, and is hardly whitened on bending and excellent in flexibility; powder for powder molding prepared from said composition; and a molded article obtained by powder molding said powder.

BACKGROUND ARTS

Hitherto, molded articles having complicated patterns such as leather grains, stitches and the like on its surface have been used as the molded articles of interior parts of automobiles, and the like. As such skin material, vinyl chloride-based resin molded articles are widely known. However, the vinyl chloride-based resin molded articles had a problem of requiring a special incineration facility because hydrogen chloride gas and the like are generated at incineration disposal after use.

The molded article of a composition composed of a polyolefin-based resin and an ethylene-α-olefin-based copolymer is proposed as that solving the problem (Japanese Patent Publication (Kokai) Hei Nos. 5-1183 and 5-5050). However, since the molded article has a property of being easily whitened on bending in comparison with the vinyl chloride-based resin molded article, and therefore, when said molded article is removed from a mold after production or when said molded article is preliminarily formed in a desired shape or the like after production, the portion bent is whitened and appearance inferiority tends to occur. Additionally, there has been a problem of being inferior in the touch because of being poor in flexibility.

Under these circumstances, the subject to be solved by the present invention is to provide an olefin-based thermoplastic elastomer composition for powder molding. which makes the best use of the merit of an olefin-based material such as no generation of poisonous gas at incineration and is hardly whitened on bending and excellent in flexibility; powder for powder molding prepared from said composition; and a molded article obtained by powder molding said powder.

DISCLOSURE OF THE INVENTION

Namely, the first invention among the present invention relates to an olefin-based thermoplastic elastomer composition for powder molding which contains 5 to 93% by weight of (a) and 7 to 95% by weight of (b) {(a)+(b)=100% by weight} described below, and is prepared from an olefin-based thermoplastic elastomer composition having a complex dynamic viscosity $\eta^*(1)$ at 250° C. of $1.5 \times 10^5$ poise or less as measured at an vibration frequency of 1 radian/sec. and a Newtonian viscosity index n of 0.67 or less as calculated by the equation [I] described below:

(a): a polyolefin-based resin; and
(b): at least one of (b1) and (b2) described below:
  (b1): a propylene-1-butene-based copolymer rubber having a Shore A hardness of 70 or less as measured in accordance with ASTM D2240 and an intrinsic viscosity [η] of 0.3 dl/g or more as measured at a temperature of 70° C. in xylene, and
  (b2): a propylene-α-olefin-ethylene-based copolymer rubber having a Shore A hardness of 70 or less as measured in accordance with ASTM D2240 and an intrinsic viscosity [η] of 0.3 dl/g or more as measured at a temperature of 70° C. in xylene and comprising propylene, an α-olefin having 4 to 20 carbon atoms and ethylene.

$$n = \{\log \eta^*(1) - \log \eta^*(100)\}/2 \qquad \text{Equation [I]}$$

(in the above-mentioned equation, $\eta^*(1)$ represents a complex dynamic viscosity at 250° C. measured at a vibration frequency of 1 radian/sec., and $\eta^*(100)$ represents a complex dynamic viscosity at 250° C. measured at a vibration frequency of 100 radian/sec.)

Further, the second invention among the present invention relates to powder for powder molding prepared from the olefin-based thermoplastic elastomer composition of the above-mentioned first invention.

Further, the third invention among the present invention relates to a molded article obtained by powder molding the powder for powder molding of the above-mentioned second invention.

BEST MODE FOR PRACTICING THE INVENTION

The polyolefin-based resin (a) used in the present invention includes a crystalline polymer or copolymer obtained by polymerizing or copolymerizing one or more of olefins (for example, a propylene homopolymer, a copolymer of propylene with ethylene and/or an α-olefin other than propylene, an ethylene homopolymer, a copolymer of ethylene with an α-olefin other than ethylene, and the like), a copolymer obtained by copolymerizing one or more of olefins at 2 steps or more (for example, a propylene-ethylene block copolymer which is obtained by carrying out the homopolymerization of propylene in the first step and carrying out the copolymerization of propylene with ethylene in the second step, a propylene-olefin copolymer which is obtained by carrying out the copolymerization of propylene with an olefin in the first step, in the second step and in successive steps, respectively and has different copolymerization compositions at respective steps, and the like). Preferable (a) is a propylene-based polymer, namely, a propylene homopolymer or a propylene-based copolymer mainly containing propylene.

(b) of the present invention is (b1): a propylene-1-butene-based copolymer rubber having a Shore A hardness of 70 or less as measured in accordance with ASTM D2240 and an intrinsic viscosity [η] of 0.3 dl/g or more as measured at a temperature of 70° C. in xylene, and/or (b2): a propylene-α-olefin-ethylene-based copolymer rubber having a Shore A hardness of 70 or less as measured in accordance with ASTM D2240 and an intrinsic viscosity [η] of 0.3 dl/g or more as measured at a temperature of 70 in xylene and comprising propylene, an α-olefin having 4 to 20 carbon atoms and ethylene.

The Shore A hardness measured in accordance with ASTM D2240 is 70 or less and preferably 60 or less in (b1) and (b2). When the hardness is too high, the thermoplastic elastomer obtained is inferior in flexibility.

The intrinsic viscosity [η] measured at 70° C. in xylene is 0.3 dl/g or more and preferably 0.5 dl/g or more in (b1) and (b2). When the intrinsic viscosity is too low, the tensile elongation property of the thermoplastic elastomer obtained is poor.

The measurement of the intrinsic viscosity [η] is carried out at 70° C. in xylene using a Ubbelohde viscometer. A sample of 300 mg is dissolved in 100 ml of xylene to prepare a solution having a concentration of 3 mg/ml. Said solution is further diluted to concentrations of 1/2, 1/3 and 1/5, and each of the solutions is measured in a constant-temperature water bath of 70° C. (±0.1° C.). The measurement is repeated three times at the respective concentrations, and an average of the values obtained is used. Herein, the intrinsic viscosity [η] is the extrapolated value of the reduced viscosity at a concentration of zero when values obtained by setting reduced viscosity (a value determined by $((\eta/\eta_0)-1)/C$ when the viscosity of a solution is η, the viscosity of a solvent is $\eta_0$, and the concentration of the solution is C) to an axis of ordinate, and setting the concentration to an axis of abscissa, are plotted, and an approximate straight line is drawn from these points.

In (b1) and (b2), those having neither crystal-melting peak nor crystallization peak at measurement by a differential scanning calorimeter (DSC) are preferable. When the conditions are not satisfied, the thermoplastic elastomer obtained happens to be inferior in flexibility. As the differential scanning calorimeter, for example, DSC220C manufactured by Seiko Electronics Industry, Co, Ltd. is used and both of the measurements at temperature-elevating process and temperature-lowering process are carried out at a rate of 10° C./min.

In (b1) and (b2), those having a molecular weight distribution (Mw/Mn) of 3 or less as measured by gel permeation chromatography (GPC) are preferable. When the molecular weight distribution is too broad, the stickiness of the thermoplastic elastomer is occasionally enlarged. The measurement of molecular weight distribution by GPC is carried out under the conditions below, for example, using 150C/GPC apparatus manufactured by Waters Co, Ltd. Elution temperature is 140° C., a column used is, for example, Shodex Packed Column A-80M manufactured by Showa Denko K.K., and a polystyrene (for example, molecular weight= 68-8,400,000 manufactured by Toso Co., Ltd.) is used as a molecular weight standard substance. A polystyrene-reduced weight average molecular weight (Mw) and number average molecular weight (Mn) are obtained, and further, the ratio (Mw/Mn) is referred to as molecular weight distribution. A sample for measurement is prepared by dissolving about 5 mg of a polymer in 5 ml of o-dichlorobenzene to be a concentration of about 1 mg/ml. 400 μL of the sample solution obtained is injected, the flow rate of elution solvent is 1.0 ml/min., and it is detected by a refractive index detector.

The 1-butene content in (b1) is preferably 0.5 to 90% by mole and further preferably 1 to 70% by mole. When said content is too small, the flexibility of the olefin-based thermoplastic elastomer composition is occasionally poor, and on the other hand, when said content is too large, the molecular weight of a copolymer is remarkably lowered and the scratch resistance of the olefin-based thermoplastic elastomer composition is occasionally poor.

The propylene content and α-olefin content in (b2) preferably have the relations below;

y/(100−x)≧0.3, more preferably y/(100−x)≧0.4, and further preferably y/(100−x)≧0.5.

When the contents deviate from the range, the flexibility of the olefin-based thermoplastic elastomer composition is occasionally poor. Moreover, in the above expressions, x represents a propylene molar content (% by mole) in the copolymer and y represents a molar content (% by mole) of the α-olefin having 4 to 20 carbons in the copolymer.

The propylene content in (b2) is preferably 90% by mole or less when low-temperature resistance is required in particular, more preferably 80% by mole or less, further preferably 70% by mole or less, preferably 60% by mole or less in particular, and most preferably 50% by mole or less. When the content deviates from the range, the low-temperature impact of the olefin-based thermoplastic elastomer composition is occasionally poor.

In (b1) and (b2), a non-conjugated diene such as 1,4-hexadiene, 1,6-octadiene, dicyclopentadiene, 2-methyl-2,5-norbornadiene, 5-ethylidene-2-norbornene or the like and an aromatic vinyl compound such as styrene, α-methylstyrene, 2,4-dimethylstyrene, p-methylstyrene, or the like may be copolymerized.

In (b1) and (b2), a portion insoluble in boiling n-heptane is preferably 5% by weight or less and further preferably 3% by weight or less. When the insoluble portion is too much, the thermoplastic elastomer composition obtained is occasionally inferior in flexibility.

Further, in (b1) and (b2), a portion soluble in boiling methyl acetate is preferably 2% by weight or less. When said soluble portion is too much, the stickiness of the thermoplastic elastomer composition is occasionally enlarged.

The configuration of a propylene and/or 1-butene side chain in (b1) and the configuration of a propylene and/or α-olefin side chain in (b2) are preferably an atactic structure. The configuration being an atactic structure indicates a case that the configuration of the side chain of propylene sequence in a copolymer is an atactic structure, a case that the configuration of the side chain of 1-butene or α-olefin sequence in a copolymer is an atactic structure, and a case that the configuration of the side chain of propylene/1-butene mixed sequence in a copolymer or propylene/α-olefin mixed sequence in a copolymer is an atactic structure. The atactic structure can be confirmed, for example, by the fact that when propylene is homopolymerized using the transition metal complex of the catalyst component used in the polymerization of (b1) and (b2), the homopolypropylene obtained has a structure in which F(1) value defined by the equation described below using the intensities of respective signals, [mm], [mr] and [rr] attributed to mm, mr and rr of the methyl carbon of propylene which can be determined by $^{13}$C-NMR spectrum, is 40 or more and 60 or less, preferably 43 or more and 57 or less, and further preferably 45 or more and 55 or less.

$$F(1)=100\times[mr]/([mm]+[mr]+[rr])$$

Similarly, concerning (b1) and (b2), the atactic structure can be also confirmed by the fact that a value corresponding to F(1) determined by using the respective signal intensities attributed to mm, mr and rr of the methyl carbon of propylene, the branched methylene carbon of 1-butene, the branched terminal methyl carbon of 1-butene, and the like, is within the above-mentioned range. When (b1) and (b2) have not the atactic structure, the thermoplastic elastomer composition obtained is occasionally inferior in flexibility because of its high hardness. Further, the attributions of the methyl carbon of propylene, the branched methylene carbon of 1-butene or α-olefin, the branched terminal methyl carbon of 1-butene or α-olefin, and the like can be carried out by referring to, for example, T. Asakura, "Macromolecules, Vol.24(1991), page 2334" and "High Polymer Analysis Handbook (1995), New Edition" published by Kinokuniya Shoten Co., Ltd.

(b1) and (b2) can be suitably produced by copolymerizing propylene and 1-butene or propylene, an α-olefin and ethylene with a polymerization catalyst which provides a polypropylene having neither crystal-melting peak nor crystallization peak at measurement by a differential scanning calorimeter (DSC), which is obtained by polymerizing propylene in the presence of the polymerization catalyst.

As the most suitable polymerization catalyst for producing (c1) and (c2), a polymerization catalyst prepared by using (A) described below, and (B) described below and/or (C) described below:

(A): a transition metal complex represented by the following general formula [I]:

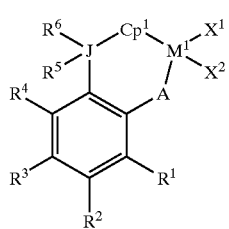

(wherein $M^1$ represents a transition metal atom of Group IV of the Periodic Table of the Elements; A represents an atom of Group XVI of the Periodic Table of the Elements; J represents an atom of Group XIV of the Periodic Table of the Elements; $Cp^1$ represents a group having a cyclopentadiene type anion skeleton; $X^1$, $X^2$, $R^1$, $R^2$, $R^3$, $R^4$, $R^5$ and $R^6$ independently represent a hydrogen atom, a halogen atom, an alkyl group, an aralkyl group, an aryl group, a substituted silyl group, an alkoxy group, an aralkyloxy group, an aryloxy group or a di-substituted amino group; and $R^1$, $R^2$, $R^3$, $R^4$, $R^5$ and $R^6$ may be optionally combined with each other to form a ring);

(B): at least one aluminum compound selected from the following (B1) to (B3)

(B1) an organoaluminum compound represented by the general formula $E^1_d AlZ_{3-d}$, (B2) a cyclic aluminoxane having a structure represented by the general formula $\{-Al(E^2)-O-\}_e$, and (B3) a linear aluminoxane having a structure represented by the general formula $E^3\{-Al(E^3)-O-\}_f AlE^3_2$ (wherein $E^1$, $E^2$ and $E^3$ respectively represents a hydrocarbon group, all of $E^1$, $E^2$ and $E^3$ may be the same or different; Z represents a hydrogen atom or a halogen atom, and all of Z may be the same or different; d represents a numeral satisfying $0<d\leq 3$; e represents an integer of not less than 2; and f represents an integer of not less than 1); and (C): a boron compound of any one of the following (C1) to (C3);

(C1) a boron compound represented by the general formula $BQ^1Q^2Q^3$, (C2) a boron compound represented by the general formula $G^+(BQ^1Q^2Q^3Q^4)^-$, and (C3) a boron compound represented by the general formula $(L-H)^+(BQ^1Q^2Q^3Q^4)^-$ (wherein B represents a boron atom in the trivalent valence state; $Q^1$ to $Q^4$ may be the same or different and represent a halogen atom, a hydrocarbon group, a halogenated hydrocarbon group, a substituted silyl group, an alkoxy group or a di-substituted amino group; G+ represents an inorganic or organic cation; L represents a neutral Lewis base; and (L—H)+ represents a Brφnsted acid).

(A) Transition Metal Complex

In the general formula [I], the transition metal atom represented by $M^1$ means a transition metal element of Group IV of the Periodic Table of the Elements (IUPAC Inorganic Chemistry Nomenclature, Revised Edition, 1989), and examples thereof include titanium atom, zirconium atom, hafnium atom, etc. Among them, titanium atom or zirconium atom is preferred.

Examples of the atom of Group XVI of the Periodic Table of the Elements as for A in the general formula [I] include oxygen atom, sulfur atom, selenium atom, etc, preferably oxygen atom.

Examples of the atom of Group XIV of the Periodic Table of the Elements as for J in the general formula [I] include a carbon atom, silicon atom, germanium atom, etc., preferably a carbon atom or silicon atom.

The group having a cyclopentadiene anion skeleton, as for the substituent $Cp^1$, includes, for example, a $\eta^5$-(substituted) cyclopentadienyl group, $\eta^5$-(substituted)indenyl group, $\eta^5$-(substituted)fluorenyl group, etc. Specific examples thereof include a $\eta^5$-cyclopentadienyl group, $\eta^5$-methylcyclopentadienyl group, $\eta^5$-dimethylcyclopentadienyl group, $\eta^5$-trimethylcyclopentadienyl group, $\eta^5$-tetramethylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-sec-butylcyclopentadienyl group, $\eta^5$-tert-butylcyclopentadienyl group, $\eta^5$-n-pentylcyclopentadienyl group, $\eta^5$-neopentylcyclopentadienyl group, $\eta^5$-n-hexylcyclopentadienyl group, $\eta^5$-n-octylcyclopentadienyl group, $\eta^5$-phenylcyclopentadienyl group, $\eta^5$-naphthylcyclopentadienyl group, $\eta^5$-trimethylsilylcyclopentadienyl group, $\eta^5$-triethylsilylcyclopentadienyl group, $\eta^5$-tert-butyldimethylsilylcyclopentadienyl group, $\eta^5$-indenyl group, $\eta^5$-methylindenyl group, $\eta^5$-dimethylindenyl group, $\eta^5$-ethylindenyl group, $\eta^5$-n-propylindenyl group, $\eta^5$-isopropylindenyl group, $\eta^5$-n-butylindenyl group, $\eta^5$-sec-butylindenyl group, $\eta^5$-tert-butylindenyl group, $\eta^5$-n-pentylindenyl group, $\eta^5$-neopentylindenyl group, $\eta^5$-n-hexylindenyl group, $\eta^5$-n-octylindenyl group, $\eta^5$-n-decylindenyl group, $\eta^5$-phenylindenyl group, $\eta^5$-methylphenylindenyl group, $\eta^5$-naphthylindenyl group, $\eta^5$-trimethylsilylindenyl group, $\eta^5$-trimethylsilylindenyl group, $\eta^5$-tert-butyldimethylsilylindenyl group, $\eta^5$-tetrahydroindenyl group, $\eta^5$-fluorenyl group, $\eta^5$-methylfluorenyl group, $\eta^5$-dimethylfluorenyl group, $\eta^5$-ethylfluorenyl group, $\eta^5$-diethylfluorenyl group, $\eta^5$-n-propylfluorenyl group, $\eta^5$-di-n-propylfluorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta^5$-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylfluorenyl group, $\eta^5$-n-octylfluorenyl group, $\eta^5$-n-decylfluorenyl group, $\eta^5$-n-dodecylfluorenyl group, $\eta^5$-phenylfluorenyl group, $\eta^5$-diphenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group, $\eta^5$-tert-butyldimethylsilylfluorenyl group, etc. Among them, $\eta^5$-cyclopentadienyl group, $\eta^5$-methylcyclopentadienyl group, $\eta^5$-tert-butylcyclopentadienyl group, $\eta^5$-tetramethylcyclopentadienyl group, $\eta^5$-indenyl group or $\eta^5$-fluorenyl group is particularly preferred.

Examples of the halogen atom in the substituent $X^1$, $X^2$, $R^1$, $R^2$, $R^3$, $R^4$, $R^5$ or $R^6$ include fluorine atom, chlorine atom, bromine atom and iodine atom, preferably chlorine atom or bromine atom, more preferably chlorine atom.

As the alkyl group in the substituent $X^1$, $X^2$, $R^1$, $R^2$, $R^3$, $R^4$, $R^5$ or $R^6$, an alkyl group having 1 to 20 carbon atoms is preferred. Examples thereof include a methyl group, ethyl group, n-propyl group, isopropyl group, n-butyl group, sec-butyl group, tert-butyl group, n-pentyl group, neopentyl group, amyl group, n-hexyl group, n-octyl group, n-decyl group, n-dodecyl group, n-pentadecyl group, n-eicosyl group, etc., more preferably a methyl group, ethyl group, isopropyl group, tert-butyl group or amyl group.

All of these alkyl groups may be substituted with a halogen atom (fluorine atom, chlorine atom, bromine atom or iodine atom). Examples of the alkyl group having 1 to 20 carbon atoms, which is substituted with the halogen atom, include fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group, etc.

All of these alkyl groups may be partially substituted with an alkoxy group such as methoxy group, ethoxy group, etc., an aryloxy group such as phenoxy group, etc. or an aralkyloxy group such as benzyloxy group, etc.

As the aralkyl group in the substituent $X^1$, $X^2$, $R^1$, $R^2$, $R^3$, $R^4$, $R^5$ or $R^6$, an aralkyl group having 7 to 20 carbon atoms is preferred. Examples thereof include a benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-timethylphenyl)methyl group, (2,3,5-timethylphenyl)methyl group, (2,3,6-timethylphenyl)methyl group, (3,4,5-timethylphenyl)methyl group, (2,4,6-timethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl) methyl group, (isopropylphenyl)methyl group, (n-butylphenyl)methyl group, (sec-butylphenyl)methyl group, (tert-butylphenyl)methyl group, (n-pentylphenyl) methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, anthracenylmethyl group, etc., more preferably a benzyl group.

All of these aralkyl groups may be partially substituted with a halogen atom (fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

As the aryl group in the substituent $X^1$, $X^2$, $R^1$, $R^2$, $R^3$, $R^4$, $R^5$ or $R^6$, an aryl group having 6 to 20 carbon atoms is preferred. Examples thereof include a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, etc., more preferably a phenyl group.

All of these aryl groups may be partially substituted with a halogen atom (fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

The substituted silyl group in the substituent $X^1$, $X^2$, $R^1$, $R^2$, $R^3$, $R^4$, $R^5$ or $R^6$ is a silyl group substituted with a hydrocarbon group, and examples of the hydrocarbon group include an alkyl group having 1 to 10 carbon atoms, such as a methyl group, ethyl group, n-propyl group, isopropyl group, n-butyl group, sec-butyl group, tert-butyl group, isobutyl group, n-pentyl group, n-hexyl group, cyclohexyl group, etc., and an aryl group such as a phenyl group. Examples of the substituted silyl group having 1 to 20 carbon atoms include mono-substituted silyl group having 1 to 20 carbon atoms, such as methylsilyl group, ethylsilyl group, phenylsilyl group, etc.; di-substituted silyl group having 2 to 20 carbon atoms, such as a dimethylsilyl group, diethylsilyl group, diphenylsilyl group, etc.; and tri-substituted silyl group having 3 to 20 carbon atoms, such as a trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group, triphenylsilyl group, etc., preferably a trimethylsilyl group, tert-butyldimethylsilyl group or triphenylsilyl group.

All of the hydrocarbon groups of these substituted silyl groups may be partially substituted with a halogen atom (fluorine atom, chlorine atom, bromine atom or iodine atom), an alkoxy group such as a methoxy group, ethoxy group, etc., an aryloxy group such as phenoxy group, etc. or an aralkyloxy group such as benzyloxy group, etc.

As the alkoxy group in the substituent $X^1$, $X^2$, $R^1$, $R^2$, $R^3$, $R^4$, $R^5$ or $R^6$, an alkoxy group having 1 to 20 carbon atoms is preferred. Examples thereof include a methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodecoxy group, n-pentadecoxy group, n-eicosoxy group, etc., more preferably a methoxy group, ethoxy group or tert-butoxy group.

All of these alkoxy groups may be partially substituted with a halogen atom (fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

As the aralkyloxy group in the substituent $X^1$, $X^2$, $R^1$, $R^2$, $R^3$, $R^4$, $R^5$ or $R^6$, an aralkyloxy group having 7 to 20 carbon atoms is preferred. Examples thereof include a benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trimethylphenyl)methoxy group, (2,3,5-trimethylphenyl)methoxy group, (2,3,6-trimethylphenyl)methoxy group, (2,4,5-trimethylphenyl)methoxy group, (2,4,6-trimethylphenyl)methoxy group, (3,4,5-trimethylphenyl)methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl)methoxy group, (ethylphenyl)methoxy group, (n-propylphenyl)methoxy group, (isopropylphenyl)methoxy group, (n-butylphenyl)methoxy group, (sec-butylphenyl)methoxy group, (tert-butylphenyl)methoxy group, (n-hexylphenyl)methoxy group, (n-octylphenyl)methoxy group, (n-decylphenyl)methoxy group, (n-tetradecylphenyl)methoxy group, naphthylmethoxy group, anthracenylmethoxy group, etc., more preferably a benzyloxy group.

All of these aralkyloxy groups may be partially substituted with a halogen atom (fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

As the aryloxy group in the substituent $X^1$, $X^2$, $R^1$, $R^2$, $R^3$, $R^4$, $R^5$ or $R^6$, an aralkyloxy group having 6 to 20 carbon atoms is preferred. Examples thereof include a phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group, etc.

All of these aryloxy groups may be partially substituted with a halogen atom (fluorine atom, chlorine atom, bromine atom or iodine atom), an alkoxy group such as a methoxy group, ethoxy group, etc., an aryloxy group such as a phenoxy group, etc. or an aralkyloxy group such as a benzyloxy group, etc.

The di-substituted amino group in the substituent $X^1$, $X^2$, $R^1$, $R^2$, $R^3$, $R^4$, $R^5$ or $R^6$ is an amino group substituted with two hydrocarbon groups, and examples of the hydrocarbon group include alkyl group having 1 to 10 carbon atoms, such as a methyl group, ethyl group, n-propyl group, isopropyl group, n-butyl group, sec-butyl group, tert-butyl group, isobutyl group, n-pentyl group, n-hexyl group, cyclohexyl group, etc.; aryl group having 6 to 10 carbon atoms, such as phenyl group, etc.; and aralkyl group having 7 to 10 carbon atoms. Examples of the di-substituted amino group substituted with the hydrocarbon group having 1 to 10 carbon atoms include dimethylamino group, diethylamino group, di-n-propylamino group, diisopropylamino group, di-n-butylamino group, di-sec-butylamino group, di-tert-butylamino group, di-isobutylamino group, tert-butylisopropylamino group, di-n-hexylamino group, di-n-octylamino group, di-n-decylamino group, diphenylamino group, bistrimethylsilylamino group, bis-tert-butyldimethylsilylamino group, etc., preferably a dimethylamino group or diethylamino group.

The substituent $R^1$, $R^2$, $R^3$, $R^4$, $R^5$ and $R^6$ may be optionally combined with each other to form a ring.

$R^1$ is preferably an alkyl group, an aralkyl group, an aryl group or a substituted silyl group.

Preferably, each of $X^1$ and $X^2$ is independently a halogen atom, an alkyl group, an aralkyl group, an alkoxy group, an aryloxy group or a di-substituted amino group, more preferably halogen atom.

Examples of the transition metal complex (A) represented by the formula [I] include transition metal complexes wherein J is a carbon atom in the general formula [I], such as methylene(cyclopentadienyl)(3,5-dimethyl-2-phenoxy)titanium dichloride, methylene(cyclopentadienyl)(3-tert-butyl-2-phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl)(3-tert-butyl-5-chloro-2-phenoxy)titanium dichloride, methylene(methylcyclopentadienyl)(3,5-dimethyl-2-phenoxy)titanium dichloride, methylene(methylcyclopentadienyl)(3-tert-butyl-2-phenoxy)titanium dichloride, methylene(methylcyclopentadienyl)(3-tert-butyl-5-methyl-2-phenoxy)titanium dichloride, methylene(methylcyclopentadienyl)(3-phenyl-2-phenoxy)titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene(methylcyclopentadienyl)(3-tert-butyl-5-chloro-2-phenoxy)titanium dichloride, methylene(tert-butylcyclopentadienyl)(3,5-dimethyl-2-phenoxy)titanium dichloride, methylene(tert-butylcyclopentadienyl)(3-tert-butyl-2-phenoxy)titanium dichloride, methylene(tert-butylcyclopentadienyl)(3-tert-butyl-5-methyl-2-phenoxy)titanium dichloride, methylene(tert-butylcyclopentadienyl)(3-phenyl-2- phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy)titanium dichloride, methylene(tert-butylcyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl-2-phenoxy)titanium dichloride, methylene(tetramethylcyclopentadienyl)(3-tert-butyl-5-methyl-2-phenoxy)titanium dichloride, methylene(tetramethylcyclopentadienyl)(3-phenyl-2-phenoxy)titanium dichloride, methylene(tetramethylcyclopentadienyl)(3-tert-butyldimethylsilyl-5-methyl-2-phenoxy)titanium dichloride, methylene(tetramethylcyclopentadienyl)(3-trimethylsilyl-5-methyl-2-phenoxy)titanium dichloride, methylene(tetramethylcyclopentadienyl)(3-tert-butyl-5-methoxy-2-phenoxy)titanium dichloride, methylene(tetramethylcyclopentadienyl)(3-tert-butyl-5-chloro-2-phenoxy)titanium dichloride, methylene(trimethylsilylcyclopentadienyl)(3,5-dimethyl-2-phenoxy)titanium dichloride, methylene(trimethylsilylcyclopentadienyl)(3-tert-butyl-2-phenoxy)titanium dichloride, methylene(trimethylsilylcyclopentadienyl)(3-tert-butyl-5-methyl-2-phenoxy)titanium dichloride, methylene(trimethylsilylcyclopentadienyl)(3-phenyl-2-phenoxy)titanium dichloride, methylene(trimethylsilylcyclopentadienyl)(3-tert-butyldimethylsilyl-5-methyl-2-phenoxy)titanium dichloride, methylene(trimethylsilylcyclopentadienyl)(3-trimethylsilyl-5-methyl-2-phenoxy)titanium dichloride, methylene(trimethylsilylcyclopentadienyl)(3-tert-butyl-5-methoxy-2-phenoxy)titanium dichloride, methylene(trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene(fluorenyl)(3-tert-butyl-2-phenoxy)titanium dichloride, methylene(fluorenyl)(3-tert-butyl-5-methyl-2-phenoxy)titanium dichloride, methylene(fluorenyl)(3-phenyl-2-phenoxy)titanium dichloride, methylene(fluorenyl)(3-tert-dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy)titanium dichloride, isopropylidene(cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene(cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene(methylcyclopentadienyl)(3,5-dimethyl-2-phenoxy)titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene(methylcyclopentadienyl)(3-tert-butyldimethylsilyl-5-methyl-2-phenoxy)titanium dichloride, isopropylidene(methylcyclopentadienyl)(3-trimethylsilyl-5-methyl-2-phenoxy)titanium dichloride, isopropylidene(methylcyclopentadienyl)(3-tert-butyl-5-methoxy-2-phenoxy)titanium dichloride, isopropylidene(methylcyclopentadienyl)(3-tert-butyl-5-chloro-2-phenoxy)titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene(tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene(tert-butylcyclopentadienyl)(3-tert-butyl-5-chloro-2-phenoxy)titanium dichloride, isopropylidene(tetramethylcyclopentadienyl)(3,5-dimethyl-2-phenoxy)titanium dichloride, isopropylidene(tetramethylcyclopentadienyl)(3-tert-butyl-2-phenoxy)titanium dichloride, isopropylidene(tetramethylcyclopentadienyl)(3-tert-butyl-5-methyl-2-phenoxy)titanium dichloride, isopropylidene(tetramethylcyclopentadienyl)(3-phenyl-2-phenoxy)titanium dichloride, isopropylidene(tetramethylcyclopentadienyl)(3-tert-butyldimethylsilyl-5-methyl-2-phenoxy)titanium dichloride, isopropylidene(tetramethylcyclopentadienyl)(3-trimethylsilyl-5-methyl-2-phenoxy)titanium dichloride, isopropylidene(tetramethylcyclopentadienyl)(3-tert-butyl-5-methoxy-2-phenoxy)titanium dichloride, isopropylidene(tetramethylcyclopentadienyl)(3-tert-butyl-5-chloro-2-phenoxy)titanium dichloride, isopropylidene(trimethylsilylcyclopentadienyl)(3,5-dimethyl-2-phenoxy)titanium dichloride, isopropylidene(trimethylsilylcyclopentadienyl)(3-tert-butyl-2-phenoxy)titanium dichloride, isopropylidene(trimethylsilylcyclopentadienyl)(3-tert-butyl-5-methyl-2-phenoxy)titanium dichloride, isopropylidene(trimethylsilylcyclopentadienyl)(3-phenyl-2-phenoxy)titanium dichloride, isopropylidene(trimethylsilylcyclopentadienyl)(3-tert-butyldimethylsilyl-5-methyl-2-phenoxy)titanium dichloride, isopropylidene(trimethylsilylcyclopentadienyl)(3-trimethylsilyl-5-methyl-2-phenoxy)titanium dichloride, isopropylidene(trimethylsilylcyclopentadienyl)(3-tert-butyl-5-methoxy-2-phenoxy)titanium dichloride, isopropylidene(trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene(fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene(fluorenyl)(3-tert-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3- tert-butyl-5-chloro-2-phenoxy)titanium dichloride, diphenylmethylene(cyclopentadienyl)(3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy)titanium dichloride, diphenylmethylene(cyclopentadienyl)(3-tert-butyldimethylsilyl-5-methyl-2-phenoxy)titanium dichloride, diphenylmethylene(cyclopentadienyl)(3-trimethylsilyl-5-methyl-2-phenoxy)titanium dichloride, diphenylmethylene(cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene(methylcyclopentadienyl)(3,5-dimethyl-2-phenoxy)titanium dichloride, diphenylmethylene(methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene(methylcyclopentadienyl)(3-tert-butyldimethylsilyl-5-methyl-2-phenoxy)titanium dichloride, diphenylmethylene(methylcyclopentadienyl)(3-trimethylsilyl-5-methyl-2-phenoxy)titanium dichloride, diphenylmethylene(methylcyclopentadienyl)(3-tert-butyl-5-methoxy-2-phenoxy)titanium dichloride, diphenylmethylene(methylcyclopentadienyl)(3-tert-butyl-5-chloro-2-phenoxy)titanium dichloride, diphenylmethylene(tert-butylcyclopentadienyl)(3,5-dimethyl-2-phenoxy)titanium dichloride, diphenylmethylene(tert-butylcyclopentadienyl)(3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl)(3-tert-butyldimethylsilyl-5-methyl-2-phenoxy)titanium dichloride, diphenylmethylene(tert-butylcyclopentadienyl)(3-trimethylsilyl-5-methyl-2-phenoxy)titanium dichloride, diphenylmethylene(tert-butylcyclopentadienyl)(3-tert-butyl-5-methoxy-2-phenoxy)titanium dichloride, diphenylmethylene(tert-butylcyclopentadienyl)(3-tert-butyl-5-chloro-2-phenoxy)titanium dichloride, diphenylmethylene(tetramethylcyclopentadienyl)(3,5-dimethyl-2-phenoxy)titanium dichloride, diphenylmethylene(tetramethylcyclopentadienyl)(3-tert-butyl-2-phenoxy)titanium dichloride, diphenylmethylene(tetramethylcyclopentadienyl)(3-tert-butyl-5-methyl-2-phenoxy)titanium dichloride, diphenylmethylene(tetramethylcyclopentadienyl)(3-phenyl-2-phenoxy)titanium dichloride, diphenylmethylene(tetramethylcyclopentadienyl)(3-tert-butyldimethylsilyl-5-methyl-2-phenoxy)titanium dichloride, diphenylmethylene(tetramethylcyclopentadienyl)(3-trimethylsilyl-5-methyl-2-phenoxy)titanium dichloride, diphenylmethylene(tetramethylcyclopentadienyl)(3-tert-butyl-5-methoxy-2-phenoxy)titanium dichloride, diphenylmethylene(tetramethylcyclopentadienyl)(3-tert-butyl-5-chloro-2-phenoxy)titanium dichloride, diphenylmethylene(trimethylsilylcyclopentadienyl)(3,5-dimethyl-2-phenoxy)titanium dichloride, diphenylmethylene(trimethylsilylcyclopentadienyl)(3-tert-butyl-2-phenoxy)titanium dichloride, diphenylmethylene(trimethylsilylcyclopentadienyl)(3-tert-butyl-5-methyl-2-phenoxy)titanium dichloride, diphenylmethylene(trimethylsilylcyclopentadienyl)(3-phenyl-2-phenoxy)titanium dichloride, diphenylmethylene(trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert-butyl-2-phenoxy)titanium dichloride, diphenylmethylene(fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl)(3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl)(3-tert-butyl-5-chloro-2-phenoxy)titanium dichloride, compounds wherein titanium of these compounds is replaced by zirconium or hafnium, compounds wherein dichloride of these compounds is replaced by dibromide, diuodide, bis(dimethylamide), bis(diethylamide), di-n-butoxide or diisopropoxide, compounds wherein (cyclopentadienyl) of these compounds is replaced by (dimethylcyclopentadienyl), (trimethylcyclopentadienyl), (n-butylcyclopentadienyl), (tert-butyldimethylsilylcyclopentadienyl) or (indenyl), and compounds wherein (3,5-dimethyl-2-phenoxy) of these compounds is replaced by (2-phenoxy), (3-methyl-2-phenoxy), (3,5-di-tert-butyl-2-phenoxy), (3-phenyl-5-methyl-2-phenoxy), (3-tert-butyldimethylsilyl-2-phenoxy) or (3-trimethylsilyl-2-phenoxy); and transition metal complex wherein J is an atom of Group XIV of the Periodic Table of the Elements other than carbon atom, such as dimethylsilyl(cyclopentadienyl)(2-phenoxy)titanium dichloride, dimethylsilyl(cyclopentadienyl)(3-methyl-2-phenoxy)titanium dichloride, dimethylsilyl(cyclopentadienyl)(3,5-dimethyl-2-phenoxy)titanium dichloride, dimethylsilyl(cyclopentadienyl)(3-tert-butyl-2-phenoxy)titanium dichloride, dimethylsilyl(cyclopentadienyl)(3-tert-butyl-5-methyl-2-phenoxy)titanium dichloride, dimethylsilyl(cyclopentadienyl)(3,5-di-tert-butyl-2-phenoxy)titanium dichloride, dimethylsilyl(cyclopentadienyl)(5-methyl-3-phenyl-2-phenoxy)titanium dichloride, dimethylsilyl(cyclopentadienyl)(3-tert-butyldimethylsilyl-5-methyl-2-phenoxy)titanium dichloride, dimethylsilyl(cyclopentadienyl)(5-methyl-3-trimethylsilyl-2-phenoxy)titanium dichloride, dimethylsilyl(cyclopentadienyl)(3-tert-butyl-5-methoxy-2-phenoxy)titanium dichloride, dimethylsilyl(cyclopentadienyl)(3-tert-butyl-5-chloro-2-phenoxy)titanium dichloride, dimethylsilyl(cyclopentadienyl)(3,5-diamyl-2-phenoxy)titanium dichloride, dimethylsilyl(methylcyclopentadienyl)(2-phenoxy)titanium dichloride, dimethylsilyl(methylcyclopentadienyl)(3-methyl-2-phenoxy)titanium dichloride, dimethylsilyl(methylcyclopentadienyl)(3,5-dimethyl-2-phenoxy)titanium dichloride, dimethylsilyl(methylcyclopentadienyl)(3-tert-butyl-2-phenoxy)titanium dichloride, dimethylsilyl(methylcyclopentadienyl)(3-tert-butyl-5-methyl-2-phenoxy)titanium dichloride, dimethylsilyl(methylcyclopentadienyl)(3,5-di-tert-butyl-2-phenoxy)titanium dichloride, dimethylsilyl(methylcyclopentadienyl)(5-methyl-3-phenyl-2-phenoxy)

titanium dichloride, dimethylsilyl(methylcyclopentadienyl)(3-tert-butyldimethylsilyl-5-methyl-2-phenoxy)titanium dichloride, dimethylsilyl(methylcyclopentadienyl)(5-methyl-3-trimethylsilyl-2-phenoxy)titanium dichloride, dimethylsilyl(methylcyclopentadienyl)(3-tert-butyl-5-methoxy-2-phenoxy)titanium dichloride, dimethylsilyl(methylcyclopentadienyl)(3-tert-butyl-5-chloro-2-phenoxy)titanium dichloride, dimethylsilyl(methylcyclopentadienyl)(3,5-diamyl-2-phenoxy)titanium dichloride, dimethylsilyl(n-butylcyclopentadienyl)(2-phenoxy)titanium dichloride, dimethylsilyl(n-butylcyclopentadienyl)(3-methyl-2-phenoxy)titanium dichloride, dimethylsilyl(n-butylcyclopentadienyl)(3,5-dimethyl-2-phenoxy)titanium dichloride, dimethylsilyl(n-butylcyclopentadienyl)(3-tert-butyl-2-phenoxy)titanium dichloride, dimethylsilyl(n-butylcyclopentadienyl)(3-tert-butyl-5-methyl-2-phenoxy)titanium dichloride, dimethylsilyl(n-butylcyclopentadienyl)(3,5-di-tert-butyl-2-phenoxy)titanium dichloride, dimethylsilyl(n-butylcyclopentadienyl)(5-methyl-3-phenyl-2-phenoxy)titanium dichloride, dimethylsilyl(n-butylcyclopentadienyl)(3-tert-butyldimethylsilyl-5-methyl-2-phenoxy)titanium dichloride, dimethylsilyl(n-butylcyclopentadienyl)(5-methyl-3-trimethylsilyl-2-phenoxy)titanium dichloride, dimethylsilyl(n-butylcyclopentadienyl)(3-tert-butyl-5-methoxy-2-phenoxy)titanium dichloride, dimethylsilyl(n-butylcyclopentadienyl)(3-tert-butyl-5-chloro-2-phenoxy)titanium dichloride, dimethylsilyl(n-butylcyclopentadienyl)(3,5-diamyl-2-phenoxy)titanium dichloride, dimethylsilyl(tert-butylcyclopentadienyl)(2-phenoxy)titanium dichloride, dimethylsilyl(tert-butylcyclopentadienyl)(3-methyl-2-phenoxy)titanium dichloride, dimethylsilyl(tert-butylcyclopentadienyl)(3,5-dimethyl-2-phenoxy)titanium dichloride, dimethylsilyl(tert-butylcyclopentadienyl)(3-tert-butyl-2-phenoxy)titanium dichloride, dimethylsilyl(tert-butylcyclopentadienyl)(3-tert-butyl-5-methyl-2-phenoxy)titanium dichloride, dimethylsilyl(tert-butylcyclopentadienyl)(3,5-di-tert-butyl-2-phenoxy)titanium dichloride, dimethylsilyl(tert-butylcyclopentadienyl)(5-methyl-3-phenyl-2-phenoxy)titanium dichloride, dimethylsilyl(tert-butylcyclopentadienyl)(3-tert-butyldimethylsilyl-5-methyl-2-phenoxy)titanium dichloride, dimethylsilyl(tert-butylcyclopentadienyl)(5-methyl-3-trimethylsilyl-2-phenoxy)titanium dichloride, dimethylsilyl(tert-butylcyclopentadienyl)(3-tert-butyl-5-methoxy-2-phenoxy)titanium dichloride, dimethylsilyl(tert-butylcyclopentadienyl)(3-tert-butyl-5-chloro-2-phenoxy)titanium dichloride, dimethylsilyl(tert-butylcyclopentadienyl)(3,5-diamyl-2-phenoxy)titanium dichloride, dimethylsilyl(tetramethylcyclopentadienyl)(2-phenoxy)titanium dichloride, dimethylsilyl(tetramethylcyclopentadienyl)(3-methyl-2-phenoxy)titanium dichloride, dimethylsilyl(tetramethylcyclopentadienyl)(3,5-dimethyl-2-phenoxy)titanium dichloride, dimethylsilyl(tetramethylcyclopentadienyl)(3-tert-butyl-2-phenoxy)titanium dichloride, dimethylsilyl(tetramethylcyclopentadienyl)(3-tert-butyl-5-methyl-2-phenoxy)titanium dichloride, dimethylsilyl(tetramethylcyclopentadienyl)(3,5-di-tert-butyl-2-phenoxy)titanium dichloride, dimethylsilyl(tetramethylcyclopentadienyl)(5-methyl-3-phenyl-2-phenoxy)titanium dichloride, dimethylsilyl(tetramethylcyclopentadienyl)(3-tert-butyldimethylsilyl-5-methyl-2-phenoxy)titanium dichloride, dimethylsilyl(tetramethylcyclopentadienyl)(5-methyl-3-trimethylsilyl-2-phenoxy)titanium dichloride, dimethylsilyl(tetramethylcyclopentadienyl)(3-tert-butyl-5-methoxy-2-phenoxy)titanium dichloride, dimethylsilyl(tetramethylcyclopentadienyl)(3-tert-butyl-5-chloro-2-phenoxy)titanium dichloride, dimethylsilyl(tetramethylcyclopentadienyl)(3,5-diamyl-2-phenoxy)titanium dichloride, dimethylsilyl(trimethylsilylcyclopentadienyl)(2-phenoxy)titanium dichloride, dimethylsilyl(trimethylsilylcyclopentadienyl)(3-methyl-2-phenoxy)titanium dichloride, dimethylsilyl(trimethylsilylcyclopentadienyl)(3,5-dimethyl-2-phenoxy)titanium dichloride, dimethylsilyl(trimethylsilylcyclopentadienyl)(3-tert-butyl-2-phenoxy)titanium dichloride, dimethylsilyl(trimethylsilylcyclopentadienyl)(3-tert-butyl-5-methyl-2-phenoxy)titanium dichloride, dimethylsilyl(trimethylsilylcyclopentadienyl)(3,5-di-tert-butyl-2-phenoxy)titanium dichloride, dimethylsilyl(trimethylsilylcyclopentadienyl)(5-methyl-3-phenyl-2-phenoxy)titanium dichloride, dimethylsilyl(trimethylsilylcyclopentadienyl)(3-tert-butyldimethylsilyl-5-methyl-2-phenoxy)titanium dichloride, dimethylsilyl(trimethylsilylcyclopentadienyl)(5-methyl-3-trimethylsilyl-2-phenoxy)titanium dichloride, dimethylsilyl(trimethylsilylcyclopentadienyl)(3-tert-butyl-5-methoxy-2-phenoxy)titanium dichloride, dimethylsilyl(trimethylsilylcyclopentadienyl)(3-tert-butyl-5-chloro-2-phenoxy)titanium dichloride, dimethylsilyl(trimethylsilylcyclopentadienyl)(3,5-diamyl-2-phenoxy)titanium dichloride, dimethylsilyl(indenyl)(2-phenoxy)titanium dichloride, dimethylsilyl(indenyl)(3-methyl-2-phenoxy)titanium dichloride, dimethylsilyl(indenyl)(3,5-dimethyl-2-phenoxy)titanium dichloride, dimethylsilyl(indenyl)(3-tert-butyl-2-phenoxy)titanium dichloride, dimethylsilyl(indenyl)(3-tert-butyl-5-methyl-2-phenoxy)titanium dichloride, dimethylsilyl(indenyl)(3,5-di-tert-butyl-2-phenoxy)titanium dichloride, dimethylsilyl(indenyl)(5-methyl-3-phenyl-2-phenoxy)titanium dichloride, dimethylsilyl(indenyl)(3-tert-butyldimethylsilyl-5-methyl-2-phenoxy)titanium dichloride, dimethylsilyl(indenyl)(5-methyl-3-trimethylsilyl-2-phenoxy)titanium dichloride, dimethylsilyl(indenyl)(3-tert-butyl-5-methoxy-2-phenoxy)titanium dichloride, dimethylsilyl(indenyl)(3-tert-butyl-5-chloro-2-phenoxy)titanium dichloride, dimethylsilyl(indenyl)(3,5-diamyl-2-phenoxy)titanium dichloride, dimethylsilyl(fluorenyl)(2-phenoxy)titanium dichloride, dimethylsilyl(fluorenyl)(3-methyl-2-phenoxy)titanium dichloride, dimethylsilyl(fluorenyl)(3,5-dimethyl-2-phenoxy)titanium dichloride, dimethylsilyl(fluorenyl)(3-tert-butyl-2-phenoxy)titanium dichloride, dimethylsilyl(fluorenyl)(3-tert-butyl-5-methyl-2-phenoxy)titanium dichloride, dimethylsilyl(fluorenyl)(3,5-di-tert-butyl-2-phenoxy)titanium dichloride, dimethylsilyl(fluorenyl)(5-methyl-3-phenyl-2-phenoxy)titanium dichloride, dimethylsilyl(fluorenyl)(3-tert-butyldimethylsilyl-5-methyl-2-phenoxy)titanium dichloride, dimethylsilyl(fluorenyl)(5-methyl-3-trimethylsilyl-2-phenoxy)titanium dichloride, dimethylsilyl(fluorenyl)(3-tert-butyl-5-methoxy-2-phenoxy)titanium dichloride, dimethylsilyl(fluorenyl)(3-tert-butyl-5-chloro-2-phenoxy)titanium dichloride, dimethylsilyl(fluorenyl)(3,5-diamyl-2-phenoxy)titanium dichloride, dimethylsilyl(tetramethylcyclopentadienyl)(1-naphthox-2-yl)titanium dichloride, compounds wherein (cyclopentadienyl) of these compounds is replaced by (dimethylcyclopentadienyl), (trimethylcyclopentadienyl), (ethylcyclopentadienyl), (n-propylcyclopentadienyl), (isopropylcyclopentadienyl), (sec-butylcyclopentadienyl), (isobutylcyclopentadienyl), (tert-butyldimethylsilylcyclopentadienyl), (phenylcyclopentadienyl), (methylindenyl) or (phenylindenyl), compounds wherein (2-phenoxy) of these compounds is replaced by (3-phenyl-2-phenoxy), (3-trimethylsilyl-2-phenoxy) or (3-tert-butyldimethylsilyl-2-phenoxy), compounds wherein dimethylsilyl of these compounds is replaced by diethylsilyl, diphenylsilyl or dimethoxysilyl, compounds wherein titanium of these compounds is replaced by zirconium or hafnium, and compound wherein dichloride of these compounds is replaced by dibromide, diiodide, bis(dimethylamide), bis(diethylamide), di-n-butoxide or diisopropoxide.

The transition metal complex represented by the above general formula [I] can be synthesized, for example, by the following method.

That is, a compound having a structure that a group having a cyclopentadienyl skeleton and a group having an alkoxybenzene skeleton are combined via an atom of Group XIV is obtained by reacting an alkoxybenzene compound whose ortho-position is halogenated with a cyclopentadiene compound substituted with a halogenated atom of Group XIV in the presence of an organoalkalinemetal or a metallic magnesium. Then, a transition metal complex represented by the above general formula [I] can be synthesized by treating the compound with a base, and reacting with a transition metal halide, a transition metal hydrocarbon compound or transition metal hydrocarbonoxy compound.

(B) Aluminum Compound

The aluminum compound (B) used in the present invention includes publicly known organoaluminum compounds, that is, one or more aluminum compounds selected from (B1) an organoaluminum compound represented by the general formula $E^1_d AlZ_{3-d}$, (B2) a cyclic aluminoxane having a structure represented by the general formula $\{-Al(E^2)-O-\}_e$ and (B3) a linear aluminoxane having a structure represented by the general formula $E^3\{-Al(E^3)-O-\}_f AlE^3_2$ (wherein $E^1$, $E^2$ and $E^3$ respectively represents a hydrocarbon group, all of $E^1$, $E^2$ and $E^3$ may be the same or different; Z represents a hydrogen atom or a halogen atom, and all of Z may be the same or different; d represents a numeral satisfying $0<d\leq 3$, e represents an integer of not less than 2: and f represents an integer of not less than 1). As the hydrocarbon group in $E^1$, $E^2$ or $E^3$, a hydrocarbon group having 1 to 8 carbon atoms is preferred and an alkyl group is more preferred.

Specific examples of the organoaluminum compound (B1) represented by $E^1_d AlZ_{3-d}$ include trialkylaluminums such as trimethylaluminum, triethylaluminum, tripropylaluminum, triisobutylaluminum, trihexylaluminum, etc.; dialkylaluminum chlorides such as dimethylaluminum chloride, diethylaluminum chloride, dipropylaluminum chloride, diisobutylaluminum chloride, dihexylaluminum chloride, etc.; alkylaluminum dichlorides such as methylaluminum dichloride, ethylaluminum dichloride, propylaluminum dichloride, isobutylaluminum dichloride, hexylaluminum dichloride, etc.; and dialkylaluminum hydrides such as dimethylaluminum hydride, diethylaluminum hydride, dipropylaluminum hydride, diisobutylaluminum hydride, dihexylaluminum hydride, etc.

Among them, trialkylaluminum is preferred and triethylaluminum or triisobutylaluminum is more preferred.

Specific examples of $E^2$ and $E^3$ in (B2) a cyclic aluminoxane having a structure represented by the general formula $\{-Al(E^2)-O-\}_e$ and (B3) a linear aluminoxane having a structure represented by the general formula $E^3-\{Al(E^3)-O-\}_f AlE^3_2$ include alkyl group such as methyl group, ethyl group, n-propyl group, isopropyl group, n-butyl group, isobutyl group, n-pentyl group, neopentyl group, etc. b is an integer of not less than 2, c is an integer of not less than 1. Each of $E^2$ and $E^3$ is preferably methyl group or isobutyl group. e is from 2 to 40 and f is from 1 to 40.

The above aluminoxane is prepared by various methods. The method is not specifically limited, and the aluminoxane may be prepared according to a publicly known method. For example, the aluminoxane is prepared by contacting a solution obtained by dissolving a trialkylaluminum (e.g. trimethylaluminum) in a suitable organic solvent (e.g. benzene, aliphatic hydrocarbon) with water. Also, there can be illustrated a method for preparing the aluminoxane by contacting a trialkylaluminum (e.g. trimethylaluminum, etc.) with a metal salt containing crystal water (e.g. copper sulfate hydrate, etc.).

(C) Boron Compound

As the boron compound (C) in the present invention, there can be used any one of (C1) a boron compound represented by the general formula $BQ^1Q^2Q^3$, (C2) a boron compound represented by the general formula $G^+(BQ^1Q^2Q^3Q^4)^-$ and (C3) a boron compound represented by the general formula $(L-H)^+(BQ^1Q^2Q^3Q^4)^-$.

In the boron compound (C1) represented by the general formula $BQ^1Q^2Q^3$, B represents a boron atom in the trivalent valence state; $Q^1$ to $Q^3$ may be the same or different and represent a halogen atom, a hydrocarbon group, a halogenated hydrocarbon group, a substituted silyl group, an alkoxy group or a di-substituted amino group. Each of $Q^1$ to $Q^3$ is preferably a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms or an amino group having 2 to 20 carbon atoms, more preferably a hydrocarbon group having 1 to 20 carbon atoms or a halogenated hydrocarbon group having 1 to 20 carbon atoms.

Specific examples of the compound (C1) include tris (pentafluorophenyl)borane, tris(2,3,5,6-tetrafluorophenyl) borane, tris(2,3,4,5-tetrafluorophenyl)borane, tris(3,4,5-trifluorophenyl)borane, tris(2,3,4-trifluorophenyl)borane, phenylbis(pentafluorophenyl)borane, etc., most preferably tris(pentafluorophenyl)borane.

In the boron compound (C2) represented by the general formula $G^+(BQ^1Q^2Q^3Q^4)^-$, $G^+$ represents an inorganic or organic cation; B represents a boron atom in the trivalent valence state; and $Q^1$ to $Q^4$ are as defined in $Q^1$ to $Q^3$.

Specific examples of $G^+$ as an inorganic cation in the compound represented by the general formula $G^+(BQ^1Q^2Q^3Q^4)^-$ include ferrocenium cation, alkyl-substituted ferrocenium cation, silver cation, etc. Examples of the $G^+$ as an organic cation include triphenylmethyl cation. $G^+$ is preferably a carbenium cation, particularly a triphenylmethyl cation. Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl) borate, tetrakis(3,4,5-trifluorophenyl)borate, tetrakis(2,2,4-trifluorophenyl)borate, phenyltris(pentafluorophenyl)borate, tetrakis(3,5-bistrifluoromethylphenyl)borate, etc.

Specific combination of them include ferroceniumtetrakis (pentafluorophenyl)borate, 1,1'-dimethylferroceniumtetrakis(pentafluorophenyl)borate, silvertetrakis(pentafluorophenyl)borate, triphenylmethyltetrakis(pentafluorophenyl)borate, triphenylmethyltetrakis(3,5-bistrifluoromethylphenyl) borate, etc., most preferably triphenylmethyltetrakis (pentafluorophenyl)borate.

In the boron compound (C3) represented by the formula $(L-H)^+(BQ^1Q^2Q^3Q^4)^-$, L represents a neutral Lewis base; $(L-H)^+$ represents a Brønsted acid; B represents a boron atom in the trivalent valence state; and $Q^1$ to $Q^4$ are as defined in $Q^1$ to $Q^3$.

Specific examples of $(L-H)^+$ as a Brønsted acid in the compound represented by the formula $(L-H)^+$ $(BQ^1Q^2Q^3Q^4)^-$ include trialkyl-substituted ammoniums, N,N-dialkylaniliniums, dialkylammoniums, triarylphosphoniums, etc., and examples of $(BQ^1Q^2Q^3Q^4)^-$ include those as defined above.

Specific combination of them include triethylammoniumtetrakis(pentafluorophenyl)borate, tripropylammoniumtetrakis(pentafluorophenyl)borate, tri(n-butyl)ammoniumtetrakis(pentafluorophenyl)borate, tri(n-butyl)ammoniumtetrakis(3,5-bistrifluoromethylphenyl) borate, N,N-dimethylaniliniumtetrakis(pentafluorophenyl) borate, N,N-diethylaniliniumtetrakis(pentafluorophenyl) borate, N,N-2,4,6-pentamethylaniliniumtetrakis (pentafluorophenyl)borate, N,N-dimethylaniliniumtetrakis (3,5-bistrifluoromethylphenyl)borate, diisopropylammoniumtetrakis (pentafluorophenyl)borate, dicyclohexylammoniumtetrakis (pentafluorophenyl)borate, triphenylphosphoniumtetrakis (pentafluorophenyl)borate, tri (methylphenyl)phosphoniumtetrakis (pentafluorophenyl) borate, tri(dimethylphenyl)phosphoniumtetrakis (pentafluorophenyl)borate, etc., most preferably tri(n-butyl) ammoniumtetrakis(pentafluorophenyl) borate or N,N-dimethylanilinumtetrakis (pentafluorophenyl)borate.

In the production of (C1) and (C2) of the present invention, an olefin polymerization catalyst prepared by using a transition metal complex (A) represented by the general formula [I], and [the above (B) and/or (C)] is most suitably used. In case of using an olefin polymerization catalyst prepared from two components (A) and (B), the above cyclic aluminoxane (B2) and/or linear aluminoxane (B3) are preferable as (B). Another preferable embodiment of the olefin polymerization catalyst includes an olefin polymerization catalyst prepared by using the above (A), (B) and (C), and in this case, the above (B1) is easily used as (B).

The respective components are desirably used so that a molar ratio of (B)/(A) is usually within the range from 0.1 to 10000, preferably 5 to 2000 and a molar ratio of (C)/(A) is usually within the range from 0.01 to 100, preferably 0.5 to 10.

When the respective components are used in the state of a solution or state suspended in a solvent, the concentration of the respective components is appropriately selected according to the conditions such as ability of an apparatus for feeding the respective components in a polymerization reactor. The respective components are desirably used so that the concentration of (A) is usually from 0.01 to 500 μmol/g, preferably from 0.05 to 100 μmol/g, more preferably from 0.05 to 50 μmol/g; the concentration of (B) is usually from 0.01 to 10000 μmol/g, preferably from 0.1 to 5000 μmol/g, more preferably from 0.1 to 2000 μmol/g, in terms of Al atom; and the concentration of (C) is usually from 0.01 to 500 μmol/g, preferably from 0.05 to 200 μmol/g, more preferably from 0.05 to 100 μmol/g.

As a polymerization reaction, there can be a solvent polymerization or slurry polymerization in which an aliphatic hydrocarbon such as butane, pentane, hexane, heptane, octane or the like; an aromatic hydrocarbon such as benzene, toluene or the like; or a halogenated hydrocarbon such as methylene dichloride or the like used as a solvent, a gas phase polymerization in a gaseous monomer, or the like. Further, either of a continuous polymerization and a batch-wise polymerization are possible.

The polymerization temperature can be adopted at a range of −50° C. to 250° C. and −20° C. to 100° C. in particular is preferable. A polymerization pressure of atmospheric pressure to 60 kg/cm² G is preferable.

In general, the polymerization time is appropriately determined according to the kind of a catalyst used and a reaction apparatus, and a range of 1 minute to 20 hours can be adopted. Further, a chain transfer agent such as hydrogen or the like can also be added to adjust a molecular weight of a polymer.

The above (A) and [(B) and/or (C)] may be charged to a reactor after previously mixing them, or may be charged through respectively separated injecting pipes thereto and mixed in the reactor. And, in a system of a plurality of reaction zones, they may be charged to the first reaction zone as a whole, or may be divisionally charged to other reaction zone(s).

The olefin-based thermoplastic elastomer composition of the present invention contains 5 to 93% by weight of (a) and 7 to 95% by weight of (b) {(a)+(b)=100% by weight}. It contains preferably 10 to 80% by weight of (a) and 20 to 90% by weight of (b). When (a) is too little, the melt-flowability becomes insufficient, and on the other hand, when (a) is too much, the flexibility becomes insufficient.

The olefin-based thermoplastic elastomer composition of the present invention may contain (c) described below, in addition to the above-mentioned (a) and (b) which are essential components.

(c): (c1) and/or (c2) described below;

(c1): a hydrogenated aromatic vinyl compound-conjugated diene compound block copolymer obtained by hydrogenating a block copolymer composed of at least two polymer blocks of aromatic vinyl compounds and at least one polymer block of conjugated diene compound, and (c2): an ethylene-α-olefin-based copolymer rubber.

Specific examples of the aromatic vinyl compound of (c1) include styrene, α-methylstyrene, p-methylstyrene, vinyl xylene, monochlorostyrene, dichlorostyrene, monobromostyrene, ethylstyrene, vinyl naphthalene and the like. Among these, styrene is preferable from the viewpoint of industrialization.

Specific examples of the conjugated diene compound of (c1) include butadiene, isoprene, 2,3-dimethyl-1,3-butadiene, 2-neopentyl-1,3-butadiene, 2-chloro-1,3-butadiene, 2-cyano-1,3-butadiene and the like. Among these, butadiene or isoprene is preferable from the viewpoint of industrialization.

(c2) includes an ethylene-α-olefin copolymer rubber and an ethylene-α-olefin-non-conjugated diene copolymer rubber. Examples of the α-olefin in the ethylene-α-olefin-based copolymer rubber include propylene, 1-butene, 1-pentene, 1-hexene, 4-methyl-pentene, 1-octene, 1-decene and the like, and among them, propylene is preferable. Further, examples of the non-conjugated diene include 1,4-hexadiene, dicyclopentadiene, 5-ethylidene-2-norbornene and the like.

An ethylene-propylene copolymer rubber is preferable from the viewpoint of low temperature impact property as (c2).

The ratio of (c1)/(c2) in case of using (c1) and (c2) in combination is not specifically limited because it differs according to a molding method, and preferably 20/80 or more.

When the olefin-based thermoplastic elastomer composition contains (c), the contents of the respective components are preferably 5 to 93% by weight of (a), 5 to 93% by weight of (b) and 2 to 90% by weight of (c), and further preferably 10 to 80% by weight of (a), 10 to 80% by weight of (b) and 10 to 80% by weight of (c). {(a)+(b)+(c)=100% by weight}. When (c) is too little, low-temperature impact property is not occasionally improved, and on the other hand, when (c) is too much, the melt-flowability becomes occasionally insufficient.

Further, according to requirement, other rubber components such as, for example, a butadiene-based copolymer, an isoprene-based copolymer or a hydrogenated product thereof, a styrene-based thermoplastic elastomer or the like may be added in the olefin-based thermoplastic elastomer composition of the present invention, in addition to the above-mentioned components. Moreover, a crosslinking reaction can be carried out by addition of a peroxide, if necessary. Further, antioxidants, thermal stabilizers, ultraviolet absorbers, lubricants, antistatic agents, pigments, fillers, flame retardants, mineral oil-based softeners, foaming agents, and foaming aids may be compounded, if necessary.

It is required that the olefin-based thermoplastic elastomer composition of the present invention has a complex dynamic viscosity $\eta^*(1)$ at 250° C. of $1.5 \times 10^5$ poise or less as measured at a vibration frequency of 1 radian/sec. and a Newtonian viscosity index n of 0.67 or less calculated by the equation [I] described below;

$$n = \{\log \eta^*(1) - \log \eta^*(100)\}/2 \qquad \text{Equation [I]}$$

(in the above-mentioned equation, $\eta^*(1)$ represents a complex dynamic viscosity at 250° C. measured at a vibration frequency of 1 radian/sec., and $\eta^*(100)$ represents a complex dynamic viscosity at 250° C. as measured at a vibration frequency of 100 radian/sec.)

The complex dynamic viscosity $\eta^*(1)$ at 250° C. as measured at a vibration frequency of 1 radian/sec. is $1.5 \times 10^5$ poise or less, preferably $5 \times 10^3$ poise or less and further preferably $3 \times 10^3$ poise or less. When $\eta^*(1)$ is too high, the melt-flowability of the thermoplastic elastomer composition becomes insufficient, and processability in powder molding method is deteriorated. Further, the lower limit value of $\eta^*(1)$ is usually $1 \times 10^2$ poise, preferably $3 \times 10^2$ poise and more preferably $5 \times 10^2$ poise. When $\eta^*(1)$ is too low, the mechanical strength of the molded article obtained becomes occasionally low. Herein, the complex dynamic viscosity $\eta^*(\omega)$ at 250° C. measured at a vibration frequency of $\omega$ radian/sec. is a value calculated by using a storage modulus $G'(\omega)$ and a loss modulus $G''(\omega)$ at 250° C. measured at a vibration frequency of $\omega$ radian/sec. according to the calculation equation [II]:

$$\eta^*(\omega) = (1/\omega)\{[G'(\omega)]^2 + [G''(\omega)]^2\}^{1/2} \qquad [II]$$

The Newtonian viscosity index n calculated by the above-mentioned equation [I] is 0.67 or less, preferably 0.01 to 0.35, and preferably 0.03 to 0.25 in particular. When n is too large, the melt-flowability of the thermoplastic elastomer composition becomes insufficient.

The method of obtaining the thermoplastic elastomer of the present invention includes a method of melt-kneading by a single screw extruder, a twin screw extruder or the like.

The olefin-based thermoplastic elastomer composition for powder molding of the present invention is processed to powder having various sizes and shapes. The powder is molded to various molded articles such as a sheet, a film or the like by powder molding method.

The powder prepared from the olefin-based thermoplastic elastomer composition has usually an average particle diameter of 1.2 mm or less, and preferably 1.0 mm or less. When the average particle diameter exceeds 1.2 mm, the mutual fusion of the powder at the powder molding becomes insufficient, and pinholes, underfills and the like tend to occur on the obtained molded article.

Further, the bulk specific gravity of the powder is preferably within a range of 0.30 to 0.65, and more preferably within a range of 0.32 to 0.65, from the viewpoint of the easiness of adhering the powder on a mold surface at the powder molding. When the adhesion of the powder on a mold surface is insufficient, pinholes, underfills and the like are easy to occur on the molded article. The bulk specific gravity is a value measured in accordance with JIS K-6721.

The powder composed of the olefin-based thermoplastic elastomer composition, having such powder properties can be easily produced, for example, by a method of pulverizing the thermoplastic elastomer composition at a temperature lower than its glass transition temperature (hereinafter, referred to as "pulverization method"), further a method of sphering the powder by solvent-treatment (hereinafter, referred to as "solvent-treatment method". For example, refer to Japanese Patent Publication (Kokai) Sho No.62-280226.), a method of thermally fusing the thermoplastic elastomer composition, extruding it from a die to form a strand, then drawing or hauling it off while stretching, and cutting it after cooling (hereinafter, referred to as a strand-cut method. For example, refer to Japanese Patent Publication (Kokai) Sho No.50-149747), a method of thermally fusing the thermoplastic elastomer composition and cutting just after the discharge opening of a die while extruding it from the die into water (hereinafter, referred to as a die-face cut method), etc.

In case of production by the pulverization method, the powder is usually produced by pulverizing the thermoplastic elastomer composition at a temperature lower than its glass transition temperature. For example, a freeze pulverization method by liquid nitrogen is suitably used. The powder can be produced by a method of mechanically pulverizing the thermoplastic elastomer composition cooled to −70° C. or less and preferably −90° C. or less using an impact-type pulverizer such as a ball mill or the like. When the pulverization is carried out at a temperature higher than −70° C., the particle diameter of the powder prepared from the thermoplastic elastomer composition pulverized becomes rough, and it is not preferable because the powder moldability is deteriorated. A method having little heat generation and high pulverization efficiency is preferable in order to prevent that the temperature of the thermoplastic elastomer composition becomes higher than the glass transition temperature at the pulverization operation. It is preferable that a pulverization equipment itself is cooled by external cooling.

In case of production by the solvent-treatment method, the thermoplastic elastomer composition is pulverized at a temperature lower than the glass transition temperature, usually −70° C. or less and preferably −90° C. or less, and then solvent-treated. Herein, the solvent-treatment method is a method of heating the thermoplastic elastomer composition pulverized at a temperature higher than the melting temperature of the thermoplastic elastomer composition and preferably at a temperature higher by 30 to 50° C. than the melting temperature while stirring in a medium having low compatibility with the composition in the presence of a dispersing agent and an emulsifier, sphering and then cooling it to take out.

Examples of the medium in the solvent treatment include ethylene glycol, polyethylene glycol, polypropylene glycol and the like, and the amount used is usually within the range of 300 to 1000 parts by weight per 100 parts by weight of the thermoplastic elastomer composition used and preferably 400 to 800 parts by weight.

Examples of the dispersing agent include an ethylene-acrylic acid copolymer, silicic acid anhydride, titanium oxide and the like, and the amount used is usually within the range of 5 to 20 parts by weight per 100 parts by weight of the thermoplastic elastomer composition used and preferably 10 to 15 parts by weight.

The emulsifier include, for example, polyoxyethylene sorbitan monolaurate, polyethylene glycol monolaurate, sorbitan tristearate and the like, but is not limited thereto. The amount used is usually within the range of 3 to 15 parts by weight per 100 parts by weight of the thermoplastic elastomer composition used, and preferably 5 to 10 parts by weight.

In case of production by the strand-cut method, a diameter of a discharge opening of the die is usually within the range of 0.1 to 3 mm and preferably 0.2 to 2 mm. A discharge rate from the die is usually within the range of 0.1 to 5 kg/hr/hole and preferably 0.5 to 3 kg/hr/hole. A haul-off rate of a strand is usually within the range of 1 to 100 m/min. and preferably 5 to 50 m/min. Further, a cut length after cooling is usually 1.4 mm or less and preferably 1.2 mm or less.

In case of production by the die-face cut method, a diameter of a discharge opening is usually within the range of 0.1 to 3 mm and preferably 0.2 to 2 mm. A discharge rate from the die is usually within the range of 0.1 to 5 kg/hr/hole and preferably 0.5 to 3 kg/hr/hole.

Further, the powder produced by the freeze-pulverization method, the solvent-treatment method, the strand-cut method and the die-face cut method is occasionally referred to as pellets.

A molded article obtained by powder molding the powder prepared from the thermoplastic elastomer composition of the present invention is hardly whitened. When the powder molding method is applied, it is suitable because even a complicated shape can be easily molded. Examples of the powder molding method include a fluidization dip method, an electrostatic coating method, a powder spray method, a powder rotational molding method, a powder slush molding method and the like.

In order to powder mold the powder prepared from the thermoplastic elastomer composition, for example, a mold optionally having a complicated pattern on its molding surface is heated to a temperature higher than that of the powder prepared from the thermoplastic elastomer composition, then the powder prepared from the thermoplastic elastomer composition is fed on the molding surface of said mold, a sheet molten article is obtained on said molding surface by thermally fusing the powders each other, and then the extra powder not thermally fused is removed. After removal of the powder, the mold may be further heated. Successively, a desired molded article can be obtained by cooling and removing the mold.

Examples of the method of heating a mold include a gas heating furnace method, a heat transfer medium-circulation method, a method of dipping into a heat transfer medium oil or a heated fluidized sand, a microwave induction heating method and the like. The mold temperature at thermally fusing the powder on the mold is usually within the range of 150 to 300° C. and preferably 190 to 270° C. The time from the feed of the powder on the molding surface of a mold till removal is not specifically limited, and is suitably selected in accordance with the size, thickness and the like of the molded article aimed.

Further, a foamed molded article having an excellent flexibility can be produced by molding those containing a foaming agent in the powder prepared from the thermoplastic elastomer composition.

In order to produce a foamed article by the powder molding method, the powder prepared from the thermoplastic elastomer composition of the present invention, in which a foaming agent is compounded, is powder molded and then foamed.

As the foaming agent, a thermal decomposition type foaming agent is usually used. Examples of the thermal decomposition type foaming agent include azo compounds such as azodicarbonamide, 2,2'-azobisisobutyronitrile, diazodiaminobenzene and the like; sulfonyl hydrazide compounds such as benzenesulfonyl hydrazide, benzene-1,3-sulfonyl hydrazide, p-toluenesulfonyl hydrazide and the like; nitroso compounds such as N,N'-dinitrosopentamethylenetetramine, N,N'-dinitroso-N,N'-dimethylterephthalamide and the like; azide compounds such as teraphthalazide and the like; and carbonates such as sodium hydrogencarbonate, ammonium hydrogencarbonate, ammonium carbonate, and the like. Among them, azodicarbonamide is preferably used.

As the method of producing those containing a foaming agent in the powder prepared from the thermoplastic elastomer composition, those can be prepared by a method of mixing a foaming agent in the powder prepared from the thermoplastic elastomer composition, a method of previously kneading a foaming agent with the thermoplastic elastomer composition below its decomposition temperature and then pulverizing. Further, a foaming aid and a cell adjuster may be mixed together with the foaming agent.

The molded article obtained by molding the powder prepared from the thermoplastic elastomer composition of the present invention is useful as a skin material, and a two-layer molded article obtained by laminating a foamed layer on one surface of the molded article may be also used as the skin material. Such two-layer molded article can be integrally produced by the powder molding method (refer to Japanese Patent Publication (Kokai) Hei No.5-473 and the like) and can be also produced by bonding a separately produced foam to the molded article obtained as described above with a bonding agent and the like.

To produce the two-layer molded article by the powder molding method, for example, a mold whose molding surface may be provided with a complicated pattern is heated to a temperature higher than the melting temperature of the thermoplastic elastomer composition, and then the powder prepared from the above-mentioned thermoplastic elastomer composition is fed on the molding surface of said mold, and the powder is melted and adhered each other to obtain a sheet-like melt on the molding surface. Successively, the extra powder not thermally fused is removed, then powder prepared from the thermoplastic polymer composition containing the foaming agent is fed on this sheet-like melt and the powder is thermally fused and adhered each other to obtain a sheet-like melt on the molding surface. Then, the extra powder not thermally fused is removed, and successively further heated and foamed to form a foamed layer.

Further, it is also possible to form a composite molded article composed of a non-foam layer-a foamed layer-a non-foam layer by the powder molding method. In this case, the non-foam layers may be the same or different.

The foaming agent includes the same thermal decomposition type foaming agents as those described above. As examples of the thermoplastic polymer composition containing the foaming agent, a expandable polyethylene-based composition used in Japanese Patent Publication (Kokai) Hei No.7-228720 can be used in addition to those containing the foaming agent in a vinyl chloride-based resin, a polyolefin, an olefin-based thermoplastic elastomer.

As the foamed layer, a polyurethane foamed article can be also used. In this case, since adhesion between the thermoplastic elastomer composition and the polyurethane tends to be inferior, the adhesion can be usually improved by pre-treating the adhered surface of the molded article, with a primer such as a chlorinated polyethylene or the like.

Further, the polyurethane foamed article can be molded by fixing the above-mentioned molded article and a core material described later at the predetermined position with providing a fixed distance, injecting a mixed liquid of a polyol and a polyisocyanate, and foaming under pressure.

The molded article or two-layer molded article is suitable as a skin material to be laminated on a thermoplastic resin core material. For example, the above-mentioned molded article can be used for a multi-layer molded article obtained by laminating a thermoplastic resin core material on one surface side thereof. Further, the two-layer molded article can be used for a multi-layer molded article obtained by laminating the thermoplastic resin core material on the foamed layer side thereof.

As the thermoplastic resin in the thermoplastic resin core material, for example, thermoplastic resins such as a polyolefin such as a polypropylene, a polyethylene or the like; an ABS resin(acrylonitrile-butadiene-styrene copolymer) and the like can be used. Among them, a polyolefin such as a polypropylene or the like is preferably used.

The multi-layer molded article can be easily produced, for example, by a method of feeding a thermoplastic resin melt on one surface of the molded article and pressing, or a method of feeding a thermoplastic resin melt on the foamed layer side of the two-layer molded article and pressing.

The thermoplastic resin melt means a thermoplastic resin in the molten state by being heated to a temperature higher than its melt temperature. The thermoplastic resin melt may be fed before or simultaneously on pressing. Further, the pressing may be carried out by using a mold or the like, or carried out by a feeding pressure of the thermoplastic resin melt. Examples of the molding method include an injection molding method, a low-pressure injection molding method, a low-pressure compression molding method and the like.

Specifically, for example, in case of using the above-mentioned molded article as the skin material, the molded article is fed between a pair of opened molds, and then both molds may be clamped after or while feeding a thermoplastic resin melt between one surface of the molded article and one mold which is opposite to the surface. In case of using a two-layer molded article as the skin material, the two-layer molded article is fed between a pair of opened molds, and then both molds may be clamped after or while feeding a thermoplastic resin melt between the foamed layer of the molded article and one mold which is opposite to the foamed layer. Herein, the opening/closing direction of both molds is not specifically limited, and may be a vertical direction or a horizontal direction.

When the molded article or the two-layer molded article produced by using the fore-mentioned mold for powder molding is used as the skin material, the mold for powder molding can be used as one mold in the production of the above-mentioned multi-layer molded article while holding the molded article or the two-layer molded article on the molded surface. According to this method, since the molded article or the two-layer molded article to which a pattern of the mold is transferred is fed between the molds without being separated from the molds, a desired multi-layer molded article can be obtained without damaging the pattern provided on the surface.

The thermoplastic resin melt may be fed after completion of clamping both the molds, but both the molds are preferably clamped while or after feeding when both the molds are not closed, because there can be obtained a multi-layer molded article wherein the molded article or the double-layer molded article scarcely shifts and a transfer degree of the pattern is improved. The method of feeding the thermoplastic resin melt is not specifically limited, and for example, the thermoplastic resin melt can be fed through a resin passage provided in one mold which is opposite to the molded article or the two-layer molded article. Further, a feeding nose of the molten resin is inserted between both the molds, the molten resin is fed, and then the feeding nose may be removed out of the system to close both the molds.

As a pair of molds, there can be used a pair of male/female molds wherein the outer peripheral surface of the one mold and inner peripheral surface of the other mold are capable of sliding. In this case, by setting a clearance in sliding surface between molds to almost the same value as that of a thickness of the molded article or the two-layer molded article, a multi-layer molded article having a marginal portion of the skin material around the article edges can be obtained. When the marginal portion of the skin material is folded back onto the back side of the multi-layer molded article, the multi-layer molded article whose edges portion are covered with the skin material can be obtained.

The present invention is illustrated according to Examples below, but the present invention is not limited these Examples.

Further, the evaluations of whitening on bending of the molded article prepared from the olefin-based thermoplastic elastomer composition were carried out according to methods below: Namely, the molded article was cut into a piece of 1 cm×5 cm and it was bent by applying a bending load of 500 g or 1 kg. Then, the load was removed after one minute, and the evaluation was carried out on the basis of the width of the portion whitened on bending according to the criteria described below:

1: The width of the whitened portion is 2 mm or more.
2: The width of the whitened portion is 1 mm or more and less than 2 mm.
3: The width of the whitened portion is less than 1 mm.
4: No whitened portion is recognized.

[I] Raw Material

Raw materials shown as follows were used for obtaining the respective compositions of Examples and Comparative Examples.

(a) Polyolefin-based Resin

An ethylene-propylene random copolymer having MI of 228 (g/10 min.) at 230° C. under a load of 2.16 kg and containing 5% by weight of ethylene.

(b1) Propylene-1-butene Copolymer Rubber

The polymer produced in Reference Example (b1) described later was used. A propylene-1-butene copolymer having a Shore A hardness of 44 measured in accordance with ASTM D2240 and an intrinsic viscosity [η] of 1.01 dl/g as measured at a temperature of 70° C. in xylene (91% by mole of propylene, 9% by mole of butene)

(b2) Propylene-α-olefin-ethylene Copolymer Rubber

The polymer produced in Reference Example (b2) described later was used. A propylene-butene-ethylene copolymer having a Shore A hardness of 29 as measured in accordance with ASTM D2240 and an intrinsic viscosity [η] of 0.92 dl/g measured at a temperature of 70° C. in xylene (35% by mole of propylene, 42% by mole of butene, 23% by mole of ethylene)

(c) Ethylene-α-olefin Copolymer Rubber

An ethylene-propylene rubber having a Mooney viscosity ($ML_{1+4}$ 121° C.) of 33 and a propylene content of 27% by mole.

EXAMPLE 1

Using a twin screw extruder, 40 parts by weight of (a), 40 parts by weight of (b1), 20 parts by weight of (c), and 0.2 part by weight of an anti-oxidant were kneaded at 180° C. to process pellets (a diameter of 3 mm, a length of 5 mm). The pellets were cooled to −120° C., and further pulverized with a freeze-pulverizer to obtain the powder of the olefin-based thermoplastic elastomer composition [which was passed through Tyler standard sieve of 32 mesh (opening of 500 μm×500 μm)].

A nickel-electroplated mold having grains on the molding surface (15 cm×15 cm×3 mm in thickness) was heated to 250° C., and 500 g of the powder obtained as described above was sprinkled on the molding surface. After 14 seconds, the powder not fused was removed, and the forementioned mold on which the fused thermoplastic elastomer composition was mounted was laid alone for 1 minute in a furnace heated at 250° C. After 1 minute, the mold was taken out from the furnace and cooled, and a molded article formed was removed from the mold.

The molded article had a uniform thickness (1 mm) and no pinhole. The test result of wrinkle-whitening on bending is shown in Table 1.

EXAMPLE 2

The same operation as in Example 1 was carried out to obtain the powder of composition, except that 40 parts by weight of (A), 40 parts by weight of (b2), 20 parts by weight of (c) and 0.2 part by weight of an anti-oxidant were used.

A nickel-electroplated mold having grains on the molding surface (15 cm×15 cm, a thickness of 3 mm) was heated to 250° C., and 500 g of the powder obtained as described above was sprinkled on the molding surface. After 14 seconds, the powder not fused was removed, and the forementioned mold on which the fused thermoplastic elastomer composition was mounted was laid alone for 1 minute in a furnace heated at 250° C. After 1 minute, the mold was taken out from the furnace and cooled, and a molded article formed was removed from the mold.

The molded article had a uniform thickness (1 mm) and no pinhole. The test result of wrinkle-whitening on bending is shown in Table 1.

COMPARATIVE EXAMPLE 1

The same operation as in Example 1 was carried out to obtain the powder of composition, except that 40 parts by weight of (A), 60 parts by weight of (c) and 0.2 part by weight of an anti-oxidant were used.

A nickel-electroplated mold having grains on the molding surface (15 cm×15 cm, a thickness of 3 mm) was heated to 250° C., and 500 g of the powder obtained as described above was sprinkled on the molding surface. After 14 seconds, the powder not fused was removed, and the forementioned mold on which the fused thermoplastic elastomer composition was mounted was laid alone for 1 minute in a furnace heated at 250° C. After 1 minute, the mold was taken out from the furnace and cooled, and a molded article formed was removed from the mold.

The molded article had a uniform thickness (1 mm) and no pinhole. The test result of wrinkle-whitening on bending is shown in Table 1.

TABLE 1

Test of wrinkle-whitening on bending

| Load | Example 1 | Example 2 | Comparative Example 1 |
| --- | --- | --- | --- |
| 500 g | 4 | 4 | 1 |
| 1000 g | 4 | 3 | 1 |

REFERENCE EXAMPLE

Transition Metal Complex: Synthesis of Dimethylsilyl(tetramethylcyclopentadienyl)(3-tert-butyl-5-methyl-2-phenoxy)titanium Dichloride (1) Synthesis of 1-Bromo-3-tert-butyl-5-methyl-2-phenol Under nitrogen atmosphere, 20.1 g (123 mmol) of 2-tert-butyl-4-methylphenol was dissolved in 150 ml of toluene in a 500 ml four necked flask equipped with a stirrer, and successively, 25.9 ml (18.0 g, 246 mmol) of tert-butylamine was added thereto. The solution was cooled to −70° C., and 10.5 ml (32.6 g, 204 mmol) of bromine was added thereto. The solution was kept at −70° C. and stirred for two hours. Then, the temperature of the solution was elevated to room temperature, 100 ml of 10% diluted hydrochloric acid per once was added thereto and the solution was rinsed three times. The organic layer obtained after the rinse was dried using anhydrous sodium sulfate, the solvent was removed using an evaporator, and then the residue was purified using a silica gel column to obtain 18.4 g (75.7 mmol) of colorless oily 1-bromo-3-tert-butyl-5-methyl-2-phenol. Yield was 62%.

(2) Synthesis of 1-Bromo-3-tert-butyl-2-methoxy-5-methylbenzene

Under nitrogen atmosphere, 13.9 g (57.2 mmol) of 1-bromo-3-tert-butyl-5-methyl-2-phenol synthesized in the above-mentioned (1) was dissolved in 40 ml of acetonitrile in a 100 ml four necked flask equipped with a stirrer, and successively, 3.8 g (67.9 mmol) of potassium hydroxide was added thereto. Further, 17.8 ml (40.6 g, 286 mmol) of methyl iodide was added, and the mixture was continued to be stirred for 12 hours. Then, the solvent was removed with an evaporator, 40 ml of hexane was added to the residue, and a portion soluble in hexane was extracted. The extraction was repeated three times. The solvent was removed from the extract to obtain 13.8 g (53.7 mmol) of light yellow oily 1-bromo-3-tert-butyl-2-methoxy-5-methylbenzene. Yield was 94%.

(3) Synthesis of (3-tert-Butyl-2-methoxy-5-methylphenyl) chlorodimethylsilane

To a solution composed of tetrahydrofuran (31.5 ml), hexane (139 ml) and 1-bromo-3-tert-butyl-2-methoxy-5-methylbenzene (45 g) synthesized in the above-mentioned (2), a 1.6 mol/l hexane solution (115 ml) of n-butyl lithium was added dropwise over 20 minutes. After the obtained mixture was kept at −40° C. for one hour, tetrahydrofuran (31.5 ml) was added dropwise.

The mixture obtained above was added dropwise at −40° C. in a solution composed of dichlorodimethylsilane (131 g)

and hexane (306 ml). The temperature of the obtained mixture was elevated to room temperature over 2 hours, and further stirred at room temperature for 12 hours.

The solvent and excessive dichlorodimethylsilane were distilled off from the reaction mixture under reduced pressure, and a portion soluble in hexane was extracted from the residue using hexane. The solvent was distilled off from the hexane solution obtained to obtain 41.9 g of light yellow oily (3-tert-butyl-2-methoxy-5-methylphenyl)chlorodimethylsilane. Yield was 84%.

(4) Synthesis of (3-tert-Butyl-2-methoxy-5-methylphenyl)dimethyl(tetramethylcyclopentadienyl)silane To a solution composed of (3-tert-butyl-2-methoxy-5-methylphenyl)chlorodimethylsilane (5.24 g) synthesized in the above-mentioned (3) and tetrahydrofuran (50 ml), tetramethylcyclopentadienyllithium (2.73 g) was added at −35° C., and the temperature of the mixture was elevated to room temperature over 2 hours and further stirred at room temperature for 10 hours.

The solvent was distilled off from the reaction mixture under reduced pressure, and a portion soluble in hexane was extracted from the residue using hexane. The solvent was distilled off from the hexane solution obtained under reduced pressure to obtain 6.69 g of light yellow oily (3-tert-butyl-2-methoxy-5-methylphenyl)dimethyl(tetramethylcyclopentadienyl)silane. Yield was 97%.

(5) Synthesis of Dimethylsilyl(tetramethylcyclopentadienyl)(3-tert-butyl-5-methyl-2-phenoxy)titanium Dichloride To a solution composed of (3-tert-butyl-2-methoxy-5-methylphenyl)dimethyl(tetramethylcyclopentadienyl)silane (10.04 g) synthesized in the above-mentioned (4), toluene (100 ml) and triethylamine (6.30 g), a 1.63 mol/l hexane solution (19.0 ml) of n-butyl lithium was added dropwise, and then, the temperature of the mixture was elevated to room temperature over 2 hours and further kept at room temperature for 12 hours.

Under nitrogen atmosphere, the mixture obtained above was added dropwise at 0° C. to a toluene solution (50 ml) of titanium tetrachloride (4.82 g), and then, after the temperature of the mixture was elevated to room temperature over 1 hour, it was refluxed by heating for 10 hours.

The reaction mixture was filtered, the solvent was distilled off from the filtrate, and the residue was re-crystallized from a toluene-hexane mixed solvent to obtain 3.46 g of dimethylsilyl(tetramethylcyclopentadienyl)(3-tert-butyl-5-methyl-2-phenoxy)titanium dichloride (shown by the chemical formula as described below) of orange color columnar crystal. Yield was 27%.

Spectrum data were as follow.

$^1$H-NMR (CDCl$_3$): δ 0.57 (s, 6H), 1.41 (s, 9H), 2.15 (s, 6H), 2.34 (s, 6H), 2.38 (s, 3H), 7.15 (s, 1H), 7.18 (s, 1H); $^{13}$C-NMR (CDCl$_3$): δ 1.25, 14.48, 16.28, 22.47, 31.25, 36.29, 120.23, 130.62, 131.47, 133.86, 135.50, 137.37, 140.82, 142.28, 167.74; Mass spectrum (CI, m/e): 458.

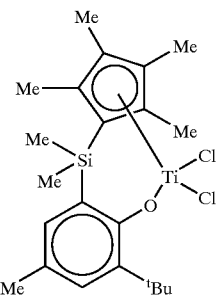

(b1) Production of Propylene-1-butene Copolymer

Propylene and 1-butene were continuously copolymerized using a 100 L SUS polymerization vessel equipped with stirring blades. Namely, hexane is continuously fed as a polymerization solvent at a rate of 83 L/hr from the lower part of the polymerization vessel. On the other hand, polymerization solution is continuously extracted from the upper part of the polymerization vessel so that the polymerization solution in the polymerization vessel is kept to 100 L in volume. As monomers, propylene and 1-butene were continuously fed at a rate of 12.00 kg/hr and 1.33 kg/hr respectively, from the lower part of the polymerization vessel in the polymerization vessel. Dimethylsilyl(tetramethylcyclopentadienyl)(3-tert-butyl-5-methyl-2-phenoxy)titanium dichloride, triphenylmethyltetrakis(pentafluorophenyl)borate and triisobutylaluminum (hereinafter, described as TIBA in abbreviation) as catalysts were continuously fed at a rate of 0.046 g/hr, 1.328 g/hr and 2.640 g/hr, respectively, from the lower part of the polymerization vessel in the polymerization vessel. Further, molecular weight control was carried out by hydrogen. The copolymerization reaction was carried out at 50° C. by circulating cooling-water in a jacket installed on the outer part of the polymerization vessel. A small amount of ethanol was added in the polymerization solution extracted from the polymerization vessel to terminate the polymerization. After removal of monomers and rinsing with water, the solvent was removed with steam in a large amount of water, and a copolymer was taken out and dried at 80° C. under reduced pressure for day and night. According to the above operation, a propylene-1-butene copolymer was obtained at a rate of 4.4 kg/hr.

(b2) Production of Propylene-1-butene-ethylene Copolymer

Ethylene, propylene and 1-butene were continuously copolymerized using a 100 L SUS polymerization vessel equipped with stirring blades. Namely, hexane is continuously fed as a polymerization solvent at a rate of 83 L/hr from the lower part of the polymerization vessel. On the other hand, polymerization solution is continuously extracted from the upper part of the polymerization vessel so that the polymerization solution in the polymerization vessel is kept to 100 L in volume. As monomers, ethylene, propylene and 1-butene were continuously fed at a rate of 2.00 kg/hr, 8.30 kg/hr and 12.70 kg/hr respectively, from the lower part of the polymerization vessel in the polymerization vessel. Dimethylsilyl(tetramethylcyclopentadienyl)(3-tert-butyl-5-methyl-2-phenoxy)titanium dichloride, triphenylmethyltetrakis(pentafluorophenyl)borate and truisobutylaluminum (hereinafter, described as TIBA in abbreviation) as catalysts were continuously fed at a rate of 0.045 g/hr, 1.378 g/hr and 2.640 g/hr respectively, from the lower part of the polymerization vessel in the polymerization vessel. Further, molecular weight control was carried out by hydrogen. The copolymerization reaction was carried out at 50° C. by circulating cooling-water in a jacket installed on the outer part of the polymerization vessel. A little amount of ethanol was added in the polymerization solution extracted from the polymerization vessel to terminate the polymerization. After removal of monomers and rinsing with water, the solvent was removed with steam in a large amount of water, and a copolymer was taken out and dried at 80° C. under reduced pressure for day and night. According to the above operation, a propylene-1-butene copolymer was obtained at a rate of 5.0 kg/hr.

Measurement Related to Propylene-1-butene Copolymer and Propylene-1-butene-ethylene Copolymer Measurement of the contents of propylene and 1-butene in the propylene-1-butene copolymer and the propylene-1-butene-ethylene copolymer was carried out according to IR method.

(1) Propylene-1-butene Copolymer

[Preparation of Calibration Curve]

Each of the mixtures of a propylene homopolymer and a 1-butene homopolymer having various mixing ratios was molded to prepare a film having a thickness of 0.05 mm by hot-pressing.

The absorption ratio of a peak (wave number: 1150 cm$^{-1}$) derived from the propylene unit to a peak (wave number: 770 cm$^{-1}$) derived from the 1-butene unit was determined using an infra-red rays photometer, and the contents of 1-butene unit in said mixtures were plotted against the absorption ratios. Regression straight line was determined from these plots, and referred to as a calibration curve. Further, both of a propylene homopolymer and a 1-butene homopolymer in the mixture were dissolved in toluene, then methanol was added, and the precipitate obtained were dried to be used.

[Measurement of 1-butene Content]

The propylene-1-butene copolymer was mold to prepare a film having a thickness of 0.05 mm by hot-pressing, then the absorption ratio of a peak derived from the propylene unit to a peak derived from the 1-butene unit was determined using an infra-red photometer, and the content of 1-butene unit in the propylene-1-butene copolymer was calculated from the calibration curve obtained by the above-mentioned method.

(2) Propylene-1-butene-ethylene Copolymer

[Preparation of Calibration Curve]

Each of the mixtures of a propylene homopolymer and a 1-butene homopolymer having various mixing ratios was molded to make a film having a thickness of 0.05 mm by heat press. The absorptions of a peak (wave number: 1150 cm$^{-1}$) derived from the propylene unit to a peak (wave number: 770 cm$^{-1}$) derived from the 1-butene unit were determined using an infra-red rays photometer, and the contents of the propylene unit and the 1-butene unit in said mixtures were plotted against the absorptions. Regression straight line was determined from these plots, and referred to as a calibration curve. Further, both of a propylene homopolymer and a 1-butene homopolymer in the mixture were dissolved in toluene, then methanol was added, and the precipitates obtained were dried to be used.

[Measurement of Propylene/1-butene Content]

The olefin copolymer was hot-pressed to mold a film having a thickness of 0.05 mm, then the absorptions of a peak derived from the propylene unit and a peak derived from the 1-butene unit were determined using infra-red photometer, and the contents of the propylene unit and the 1-butene unit in the olefin copolymer were calculated from the calibration curve obtained by the above-mentioned method.

The hardness of the propylene-1-butene copolymer was measured in accordance with ASTM D2240.

The measurement of differential scanning calorimeter (DSC) was carried out at a rate of 10° C./min. in both a temperature-elevating process and a temperature-lowering process.

The measurement of the intrinsic viscosity [η] was carried out at 70° C. in xylene using a Ubbelohde viscometer. A sample of 300 mg is dissolved in 100 ml of xylene to prepare a solution having a concentration of 3 mg/ml. The solution is further diluted to concentrations of 1/2, 1/3 and 1/5, and each of the solutions is measured in a constant-temperature water bath of 70° C. (±0.1° C.). The measurement was repeated three times at the respective concentrations, and an average of the values obtained was used. Herein, a value obtained by setting reduced viscosity (a value determined by $((\eta/\eta_0)-1)/C$ when the viscosity of a solution is $\eta$, the viscosity of a solvent is $\eta_0$, and the concentration of the solution is C) to an axis of ordinate, and setting the concentration to an axis of abscissa, is plotted. An approximate straight line is drawn from these points, and the extrapolated value of the reduced viscosity at a concentration of zero was referred to as the intrinsic viscosity.

Molecular weight distribution was carried out according to Gel Permeation Chromatography (GPC) (manufacture by Waters Co., Ltd., and 150C/GPC apparatus was used). Elution temperature was 140° C., a column used was Shodex Packed Column A-80M manufacture by Showa-Denko K.K., and the standard substance of molecular weight used a polystyrene (manufacture by Toso Co., Ltd., and molecular weight: 68-8,400,000). The polystyrene-reduced weight average molecular weight (Mw) and number average molecular weight (Mn) were obtained, and further, the ratio (Mw/Mn) is referred to as the molecular weight distribution. A sample for measurement is prepared by dissolving about 5 mg of a polymer in 5 ml of o-dichlorobenzene to be a concentration of about 1 mg/ml. 400 μL of the sample solution obtained was injected, the flow rate of elution solvent was 1.0 ml/min., and it was detected by a refractive index detector.

INDUSTRIAL APPLICABILITY

As described above, according to the present invention, an olefin-based thermoplastic elastomer composition for powder molding, which makes the best use of the merit of an olefin-based material such as no generation of poisonous gas at incineration and is hardly whitened on bending and excellent in flexibility; powder for powder molding prepared from the composition; and a molded article obtained by powder molding the powder; can be provided.

What is claimed is:

1. An olefin-based thermoplastic elastomer composition for powder molding, which comprises 5 to 93% by weight of (a) and 7 to 95% by weight of (b) described below, and has a complex dynamic viscosity η*(1) at 250° C. of 1.5×10$^5$ poise or less as measured at a vibration frequency of 1 radian/sec. and a Newtonian viscosity index n of 0.67 or less as calculated by the equation [I] described below:

(a) a polyolefin-based resin;

(b) at least one of (b1) and (b2):

(b1) a propylene-1-butene-based copolymer rubber having a Shore A hardness of 70 or less as measured in accordance with ASTM D2240 and an intrinsic viscosity [η] of 0.3 dl/g or more as measured at a temperature of 70° C. in xylene, (b2) a propylene-α-olefin-ethylene-based copolymer rubber having a Shore A hardness of 70 or less as measured in accordance with ASTM D2240 and an intrinsic viscosity [η] of 0.3 dl/g or more as measured at a temperature of 70° C. in xylene and comprising propylene, an α-olefin having 4 to 20 carbon atoms, and ethylene; and $$n=\{(\log \eta^*(1) - \log \eta^*(100)\}/2; \text{ wherein } \eta^*(1) \quad \text{equation [I]}$$

represents a complex dynamic viscosity at 250° C. measured at a vibration frequency of 1 radian/sec., and η*(100) represents a complex dynamic viscosity at 250° C. measured at a vibration frequency of 100 radian/sec.

2. The olefin-based thermoplastic elastomer composition for powder molding according to claim 1, wherein (a) is a propylene-based polymer.

3. The olefin-based thermoplastic elastomer composition for powder molding according to claim 1, wherein (b1) has neither crystal-melting peak nor crystallization peak at measurement by a differential scanning calorimeter (DSC).

4. The olefin-based thermoplastic elastomer composition for powder molding according to claim 1, wherein (b1) has a molecular weight distribution (Mw/Mn) of 3 or less at measurement by gel permeation chromatography.

5. The olefin-based thermoplastic elastomer composition for powder molding according to claim 1, wherein (b2) has neither crystal-melting peak nor crystallization peak at measurement by a differential scanning calorimeter.

6. The olefin-based thermoplastic elastomer composition for powder molding according to claim 1, wherein (b2) has a molecular weight distribution (Mw/Mn) of 3 or less at measurement by gel permeation chromatography.

7. Powder for powder molding prepared from the olefin-based thermoplastic elastomer composition of claim 1.

8. Powder for powder molding according to claim 7, produced by a pulverization method, a solvent-treatment method, a strand cut method or a die-face cut method.

9. Powder for powder molding according to claim 7, wherein a sphere-reduced average particle diameter is 1.2 mm or less.

10. A molded article obtained by powder molding the powder for powder molding according to claim 7.

* * * * *